(12) United States Patent
Black et al.

(10) Patent No.: US 11,706,722 B2
(45) Date of Patent: Jul. 18, 2023

(54) COMMUNICATION OF WIRELESS SIGNALS THROUGH PHYSICAL BARRIERS

(71) Applicant: Pivotal Commware, Inc., Kirkland, WA (US)

(72) Inventors: Eric James Black, Bothell, WA (US); Mersad Cavcic, Kirkland, WA (US); Brian Mark Deutsch, Issaquah, WA (US); Alexander Remley Katko, Seattle, WA (US); Jay Howard McCandless, Alpine, CA (US); Adam Deloss Rea, Edmonds, WA (US); Ryan Dale Rutledge, Marysville, WA (US); Shannon Lee Hitchen, Renton, WA (US); Seyed Ali Malek Abadi, Mill Creek, WA (US); Jordan Philip Doležílek Read, Woodinville, WA (US)

(73) Assignee: Pivotal Commware, Inc., Bothell, WA (US)

( * ) Notice: Subject to any disclaimer, the term of this patent is extended or adjusted under 35 U.S.C. 154(b) by 288 days.

(21) Appl. No.: 17/112,895

(22) Filed: Dec. 4, 2020

(65) Prior Publication Data

US 2021/0176719 A1 Jun. 10, 2021

Related U.S. Application Data

(63) Continuation of application No. 16/730,932, filed on Dec. 30, 2019, now Pat. No. 10,863,458, which is a (Continued)

(51) Int. Cl.
*H04W 52/52* (2009.01)
*H04W 24/02* (2009.01)
(Continued)

(52) U.S. Cl.
CPC .......... *H04W 52/52* (2013.01); *H01Q 1/364* (2013.01); *H01Q 1/42* (2013.01); *H01Q 1/52* (2013.01);
(Continued)

(58) Field of Classification Search
CPC ... H04W 52/52; H04W 24/02; H04W 52/143; H04W 52/146; H04W 52/14;
(Continued)

(56) References Cited

U.S. PATENT DOCUMENTS 2,131,108 A 9/1938 Lindenblad
4,464,663 A 8/1984 Lalezari et al.
(Continued)

FOREIGN PATENT DOCUMENTS

CN 102948089 A 2/2013
CN 106664124 A 5/2017
(Continued)

OTHER PUBLICATIONS

Office Communication for U.S. Appl. No. 15/925,612 dated Jun. 15, 2018, pp. 1-9.
(Continued)

*Primary Examiner* — Ankur Jain
(74) *Attorney, Agent, or Firm* — John W. Branch; Branch Partners PLLC

(57) ABSTRACT

A system for transmitting and receiving wireless signals through a physical barrier, such as walls or windows, to wireless computing devices that are located internal to a structure that is formed in part by the physical barrier. The wireless signals are millimeter waveforms with gigahertz frequencies that are communicated with 5G communication protocols by one or more remote base station nodes located external to the physical barrier. One or more external antennas are configured to communicate RF wireless signals with
(Continued)

HMA waveforms to remote wireless base station. In one or more embodiments, the RF wireless signals are amplified and communicated bi-statically through the window barrier between customer premises equipment and an authorized remote wireless base station.

26 Claims, 18 Drawing Sheets

Related U.S. Application Data continuation of application No. 16/568,096, filed on Sep. 11, 2019, now Pat. No. 10,524,216, which is a continuation of application No. 16/358,112, filed on Mar. 19, 2019, now Pat. No. 10,425,905.

(60) Provisional application No. 62/730,497, filed on Sep. 12, 2018, provisional application No. 62/645,004, filed on Mar. 19, 2018.

(51) Int. Cl.
    *H04W 52/14*     (2009.01)
    *H01Q 3/44*     (2006.01)
    *H01Q 21/06*     (2006.01)
    *H01Q 1/52*     (2006.01)
    *H01Q 1/36*     (2006.01)
    *H01Q 1/42*     (2006.01)

(52) U.S. Cl.
    CPC ............ *H01Q 3/44* (2013.01); *H01Q 21/065* (2013.01); *H04W 24/02* (2013.01); *H04W 52/143* (2013.01); *H04W 52/146* (2013.01)

(58) Field of Classification Search
    CPC  H01Q 1/364; H01Q 1/42; H01Q 1/52; H01Q 3/44; H01Q 21/065; H04B 17/382; H04B 17/318; H04B 1/401; H04B 1/44
    See application file for complete search history.

(56) References Cited

U.S. PATENT DOCUMENTS

| | | | |
|---|---|---|---|
| 6,133,880 A | 10/2000 | Grangeat et al. | |
| 6,150,987 A | 11/2000 | Sole et al. | |
| 6,529,745 B1 | 3/2003 | Fukagawa et al. | |
| 6,680,923 B1 | 1/2004 | Leon | |
| 7,084,815 B2 | 8/2006 | Phillips et al. | |
| 7,205,949 B2 | 4/2007 | Turner | |
| 9,356,356 B2 | 5/2016 | Chang et al. | |
| 9,385,435 B2 | 7/2016 | Bily et al. | |
| 9,450,310 B2 | 9/2016 | Bily et al. | |
| 9,551,785 B1 | 1/2017 | Geer | |
| 9,608,314 B1 | 3/2017 | Kwon et al. | |
| 9,635,456 B2 | 4/2017 | Fenichel | |
| 9,711,852 B2 | 7/2017 | Chen et al. | |
| 9,806,414 B2 | 10/2017 | Chen et al. | |
| 9,806,415 B2 | 10/2017 | Chen et al. | |
| 9,806,416 B2 | 10/2017 | Chen et al. | |
| 9,812,779 B2 | 11/2017 | Chen et al. | |
| 9,813,141 B1 * | 11/2017 | Marupaduga | H04W 28/0268 |
| 9,936,365 B1 | 4/2018 | Elam | |
| 9,955,301 B2 | 4/2018 | Markhovsky et al. | |
| 10,014,948 B2 | 7/2018 | Ashrafi | |
| 10,020,891 B2 | 7/2018 | Ashrafi | |
| 10,033,109 B1 | 7/2018 | Gummalla et al. | |
| 10,153,845 B2 | 12/2018 | Ashrafi | |
| 10,187,156 B2 | 1/2019 | Ashrafi | |
| 10,225,760 B1 | 3/2019 | Black | |
| 10,277,338 B2 | 4/2019 | Reial et al. | |
| 10,313,894 B1 | 6/2019 | Desclos et al. | |
| 10,324,158 B2 | 6/2019 | Wang et al. | |
| 10,374,710 B2 | 8/2019 | Ashrafi | |
| 10,431,899 B2 * | 10/2019 | Bily | H01Q 3/247 |
| 10,468,767 B1 | 11/2019 | McCandless et al. | |
| 10,491,303 B2 | 11/2019 | Ashrafi | |
| 10,505,620 B2 | 12/2019 | Ito et al. | |
| 10,547,386 B2 | 1/2020 | Ashrafi | |
| 10,734,736 B1 | 8/2020 | McCandless et al. | |
| 11,069,975 B1 | 7/2021 | Mason et al. | |
| 11,190,266 B1 | 11/2021 | Black et al. | |
| 11,252,731 B1 | 2/2022 | Levitsky et al. | |
| 2002/0196185 A1 | 12/2002 | Bloy | |
| 2003/0025638 A1 | 2/2003 | Apostolos | |
| 2003/0062963 A1 | 4/2003 | Aikawa et al. | |
| 2004/0003250 A1 | 1/2004 | Kindberg et al. | |
| 2004/0038714 A1 | 2/2004 | Rhodes et al. | |
| 2004/0229651 A1 | 11/2004 | Hulkkonen et al. | |
| 2005/0237265 A1 | 10/2005 | Durham et al. | |
| 2005/0282536 A1 | 12/2005 | McClure et al. | |
| 2006/0025072 A1 * | 2/2006 | Pan | H04B 7/15 455/7 |
| 2007/0024514 A1 | 2/2007 | Phillips et al. | |
| 2007/0147338 A1 | 6/2007 | Chandra et al. | |
| 2007/0184828 A1 | 8/2007 | Majidi-Ahy | |
| 2007/0202931 A1 * | 8/2007 | Lee | H04B 3/58 340/538.17 |
| 2008/0039012 A1 * | 2/2008 | McKay | H04B 7/1555 455/11.1 |
| 2008/0049649 A1 | 2/2008 | Kozisek et al. | |
| 2008/0181328 A1 | 7/2008 | Harel et al. | |
| 2009/0153407 A1 | 6/2009 | Zhang et al. | |
| 2009/0176487 A1 | 7/2009 | DeMarco | |
| 2009/0207091 A1 | 8/2009 | Anagnostou et al. | |
| 2009/0231215 A1 | 9/2009 | Taura | |
| 2009/0296938 A1 | 12/2009 | Devanand et al. | |
| 2010/0197222 A1 * | 8/2010 | Scheucher | H04B 7/15557 455/11.1 |
| 2010/0207823 A1 | 8/2010 | Sakata et al. | |
| 2010/0248659 A1 | 9/2010 | Kawabata | |
| 2010/0302112 A1 | 12/2010 | Lindenmeier et al. | |
| 2011/0070824 A1 | 3/2011 | Braithwaite | |
| 2011/0199279 A1 | 8/2011 | Shen et al. | |
| 2011/0292843 A1 | 12/2011 | Gan et al. | |
| 2012/0064841 A1 | 3/2012 | Husted et al. | |
| 2012/0094630 A1 | 4/2012 | Wisnewski et al. | |
| 2012/0194399 A1 | 8/2012 | Bily et al. | |
| 2013/0059620 A1 | 3/2013 | Cho | |
| 2013/0069834 A1 | 3/2013 | Duerksen | |
| 2013/0231066 A1 | 9/2013 | Zander et al. | |
| 2013/0303145 A1 | 11/2013 | Harrang et al. | |
| 2013/0324076 A1 | 12/2013 | Harrang | |
| 2014/0094217 A1 | 4/2014 | Stafford | |
| 2014/0171811 A1 | 6/2014 | Lin et al. | |
| 2014/0198684 A1 | 7/2014 | Gravely et al. | |
| 2014/0266946 A1 | 9/2014 | Bily et al. | |
| 2014/0269417 A1 | 9/2014 | Yu et al. | |
| 2014/0293904 A1 | 10/2014 | Dai et al. | |
| 2014/0308962 A1 | 10/2014 | Zhang et al. | |
| 2014/0349696 A1 | 11/2014 | Hyde et al. | |
| 2015/0109178 A1 | 4/2015 | Hyde et al. | |
| 2015/0109181 A1 | 4/2015 | Hyde et al. | |
| 2015/0116153 A1 | 4/2015 | Chen et al. | |
| 2015/0131618 A1 | 5/2015 | Chen | |
| 2015/0162658 A1 | 6/2015 | Bowers et al. | |
| 2015/0222021 A1 | 8/2015 | Stevenson et al. | |
| 2015/0229028 A1 | 8/2015 | Bily et al. | |
| 2015/0236777 A1 * | 8/2015 | Akhtar | H04B 7/15528 455/450 |
| 2015/0276926 A1 | 10/2015 | Bowers et al. | |
| 2015/0276928 A1 | 10/2015 | Bowers et al. | |
| 2015/0288063 A1 | 10/2015 | Johnson et al. | |
| 2015/0318618 A1 | 11/2015 | Chen et al. | |
| 2015/0372389 A1 | 12/2015 | Chen et al. | |
| 2016/0037508 A1 | 2/2016 | Sun | |
| 2016/0079672 A1 | 3/2016 | Cerreno | |
| 2016/0087334 A1 | 3/2016 | Sayama et al. | |
| 2016/0149308 A1 | 5/2016 | Chen et al. | |
| 2016/0149309 A1 | 5/2016 | Chen et al. | |
| 2016/0149310 A1 | 5/2016 | Chen et al. | |
| 2016/0164175 A1 | 6/2016 | Chen et al. | |
| 2016/0174241 A1 | 6/2016 | Ansari et al. | |

(56) References Cited

U.S. PATENT DOCUMENTS

| | | |
|---|---|---|
| 2016/0198334 A1 | 7/2016 | Bakshi et al. |
| 2016/0219539 A1 | 7/2016 | Kim et al. |
| 2016/0241367 A1 | 8/2016 | Irmer et al. |
| 2016/0269964 A1 | 9/2016 | Murray |
| 2016/0345221 A1 | 11/2016 | Axmon et al. |
| 2016/0365754 A1 | 12/2016 | Zeine et al. |
| 2016/0373181 A1 | 12/2016 | Black et al. |
| 2017/0118750 A1 | 4/2017 | Kikuma et al. |
| 2017/0127295 A1 | 5/2017 | Black et al. |
| 2017/0127296 A1 | 5/2017 | Gustafsson et al. |
| 2017/0127332 A1 | 5/2017 | Axmon et al. |
| 2017/0155192 A1 | 6/2017 | Black et al. |
| 2017/0155193 A1 | 6/2017 | Black et al. |
| 2017/0187123 A1 | 6/2017 | Black et al. |
| 2017/0187426 A1 | 6/2017 | Su et al. |
| 2017/0194704 A1 | 7/2017 | Chawgo et al. |
| 2017/0195054 A1 | 7/2017 | Ashrafi |
| 2017/0238141 A1 | 8/2017 | Lindoff et al. |
| 2017/0310017 A1 | 10/2017 | Howard |
| 2017/0339575 A1 | 11/2017 | Kim et al. |
| 2017/0367053 A1 | 12/2017 | Noh et al. |
| 2017/0373403 A1 | 12/2017 | Watson |
| 2018/0013193 A1 | 1/2018 | Olsen et al. |
| 2018/0027555 A1 | 1/2018 | Kim et al. |
| 2018/0066991 A1 | 3/2018 | Mueller et al. |
| 2018/0097286 A1 | 4/2018 | Black et al. |
| 2018/0123692 A1 | 5/2018 | Leiba |
| 2018/0177461 A1 | 6/2018 | Bell et al. |
| 2018/0219283 A1 | 8/2018 | Wilkins et al. |
| 2018/0227035 A1 | 8/2018 | Cheng et al. |
| 2018/0227445 A1 | 8/2018 | Minegishi |
| 2018/0233821 A1 | 8/2018 | Pham et al. |
| 2018/0270729 A1 | 9/2018 | Ramachandra et al. |
| 2018/0301821 A1* | 10/2018 | Black ................ H01Q 15/0066 |
| 2018/0337445 A1 | 11/2018 | Sullivan et al. |
| 2018/0368389 A1 | 12/2018 | Adams |
| 2019/0020107 A1* | 1/2019 | Polehn .................. H01Q 1/523 |
| 2019/0052428 A1 | 2/2019 | Chu et al. |
| 2019/0053013 A1 | 2/2019 | Markhovsky et al. |
| 2019/0067813 A1 | 2/2019 | Igura |
| 2019/0219982 A1 | 7/2019 | Klassen et al. |
| 2019/0221931 A1 | 7/2019 | Black et al. |
| 2019/0289482 A1 | 9/2019 | Black |
| 2019/0336107 A1 | 11/2019 | Hope Simpson et al. |
| 2019/0372671 A1 | 12/2019 | Ashrafi |
| 2020/0008163 A1 | 1/2020 | Black et al. |
| 2020/0083605 A1 | 3/2020 | Quarfoth et al. |
| 2020/0083960 A1 | 3/2020 | Ashrafi |
| 2020/0137698 A1 | 4/2020 | Black et al. |
| 2020/0186227 A1 | 6/2020 | Reider et al. |
| 2020/0205012 A1 | 6/2020 | Bengtsson et al. |
| 2020/0259552 A1 | 8/2020 | Ashworth |
| 2020/0313741 A1 | 10/2020 | Zhu et al. |
| 2020/0366363 A1 | 11/2020 | Li et al. |
| 2020/0403689 A1 | 12/2020 | Rofougaran et al. |
| 2021/0067237 A1 | 3/2021 | Sampath et al. |
| 2021/0234591 A1 | 7/2021 | Eleftheriadis et al. |
| 2021/0328664 A1 | 10/2021 | Schwab et al. |
| 2021/0367684 A1 | 11/2021 | Bendinelli et al. |
| 2021/0368355 A1 | 11/2021 | Liu et al. |
| 2022/0014933 A1 | 1/2022 | Moon et al. |
| 2022/0053433 A1 | 2/2022 | Abedini et al. |

FOREIGN PATENT DOCUMENTS

| | | |
|---|---|---|
| CN | 106797074 A | 5/2017 |
| CN | 109478900 A | 3/2019 |
| CN | 110034416 A | 7/2019 |
| CN | 110521277 A | 11/2019 |
| EP | 3273629 A1 | 1/2018 |
| EP | 3440778 A1 | 2/2019 |
| EP | 3603329 A1 | 2/2020 |
| JP | 61-1102 A | 1/1986 |
| JP | 936656 A | 2/1997 |
| JP | 2000-111630 A | 4/2000 |
| JP | 3307146 B2 | 7/2002 |
| JP | 3600459 B2 | 12/2004 |
| JP | 2007081648 A | 3/2007 |
| JP | 2007306273 A | 11/2007 |
| JP | 2008-153798 A | 7/2008 |
| JP | 2011-508994 A | 3/2011 |
| JP | 2012-175189 A | 9/2012 |
| JP | 2014207626 A | 10/2014 |
| JP | 2016-139965 A | 8/2016 |
| JP | 2017-220825 A | 12/2017 |
| JP | 2018-14713 A | 1/2018 |
| JP | 2018-173921 A | 11/2018 |
| JP | 2019518355 A | 6/2019 |
| JP | 2020515162 A | 5/2020 |
| JP | 2020-523863 A | 8/2020 |
| JP | 2020-145614 A | 9/2020 |
| KR | 10 2016 0113100 A | 9/2016 |
| KR | 20190010545 A | 1/2019 |
| KR | 20190133194 A | 12/2019 |
| WO | 2010104435 A1 | 9/2010 |
| WO | 2012050614 A1 | 4/2012 |
| WO | 2012096611 A2 | 7/2012 |
| WO | 2012161612 A1 | 11/2012 |
| WO | 2013023171 A1 | 2/2013 |
| WO | 2015196044 A1 | 12/2015 |
| WO | 2016044069 A1 | 3/2016 |
| WO | 2017014842 A1 | 1/2017 |
| WO | 2017176746 A1 | 10/2017 |
| WO | 2017193056 A1 | 11/2017 |
| WO | 2018144940 A1 | 8/2018 |
| WO | 2018175615 A1 | 9/2018 |
| WO | 2018179870 A1 | 10/2018 |
| WO | 2020076350 A1 | 4/2020 |
| WO | 2020095597 A1 | 5/2020 |

OTHER PUBLICATIONS

U.S. Appl. No. 14/510,947, filed Oct. 9, 2014, pp. 1-76.
Office Communication for U.S. Appl. No. 16/049,630 dated Oct. 4, 2018, pp. 1-13.
Office Communication for U.S. Appl. No. 15/870,758 dated Oct. 1, 2018, pp. 1-12.
Office Communication for U.S. Appl. No. 16/136,119 dated Nov. 23, 2018, pp. 1-12.
Office Communication for U.S. Appl. No. 16/136,119 dated Mar. 15, 2019, pp. 1-8.
Office Communication for U.S. Appl. No. 16/292,022 dated Jun. 7, 2019, pp. 1-13.
Office Communication for U.S. Appl. No. 16/049,630 dated Apr. 12, 2019, pp. 1-13.
Office Communication for U.S. Appl. No. 16/268,469 dated May 16, 2019, pp. 1-16.
Office Communication for U.S. Appl. No. 16/280,939 dated May 13, 2019, pp. 1-22.
Office Communication for U.S. Appl. No. 16/440,815 dated Jul. 17, 2019, pp. 1-16.
Office Communication for U.S. Appl. No. 16/358,112 dated Mar. 15, 2019, pp. 1-17.
International Search Report and Written Opinion for International Application No. PCT/US2019/022942 dated Jul. 4, 2019, pp. 1-12.
International Search Report and Written Opinion for International Application No. PCT/US2019/022987 dated Jul. 2, 2019, pp. 1-13.
Office Communication for U.S. Appl. No. 16/049,630 dated Jun. 24, 2019, pp. 1-5.
Office Communication for U.S. Appl. No. 16/280,939 dated Jul. 18, 2019, pp. 1-7.
Office Communication for U.S. Appl. No. 16/049,630 dated Aug. 7, 2019, pp. 1-13.
Office Communication for U.S. Appl. No. 16/292,022 dated Sep. 23, 2019, pp. 1-9.
Office Communication for U.S. Appl. No. 16/440,815 dated Oct. 7, 2019, pp. 1-5.
Office Communication for U.S. Appl. No. 16/268,469 dated Sep. 10, 2019, pp. 1-11.

(56) References Cited

OTHER PUBLICATIONS

International Search Report and Written Opinion for International Application No. PCT/US2019/041053 dated Aug. 27, 2019, pp. 1-15.
Office Communication for U.S. Appl. No. 16/568,096 dated Oct. 24, 2019, pp. 1-10.
International Search Report and Written Opinion for International Application No. PCT/US2019/047093 dated Oct. 21, 2019, pp. 1-14.
Office Communication for U.S. Appl. No. 16/049,630 dated Dec. 9, 2019, pp. 1-13.
Office Communication for U.S. Appl. No. 16/440,815 dated Jan. 8, 2020, pp. 1-8.
Office Communication for U.S. Appl. No. 16/730,932 dated Mar. 6, 2020, pp. 1-14.
Office Communication for U.S. Appl. No. 16/049,630 dated Mar. 31, 2020, pp. 1-16.
Office Communication for U.S. Appl. No. 16/734,195 dated Mar. 20, 2020, pp. 1-9.
Office Communication for U.S. Appl. No. 16/846,670 dated Jun. 11, 2020, pp. 1-12.
Office Communication for U.S. Appl. No. 16/673,852 dated Jun. 24, 2020, pp. 1-11.
International Search Report and Written Opinion for Application No. PCT/US2020/016641 dated Apr. 14, 2020, pp. 1-12.
International Search Report and Written Opinion for Application No. PCT/US2020/013713 dated Apr. 21, 2020, pp. 1-9.
Office Communication for U.S. Appl. No. 16/049,630 dated Aug. 19, 2020, pp. 1-18.
Office Communication for U.S. Appl. No. 16/730,932 dated Aug. 25, 2020, pp. 1-5.
Office Communication for U.S. Appl. No. 16/983,927 dated Aug. 31, 2020, pp. 1-7.
Office Communication for U.S. Appl. No. 16/983,978 dated Sep. 16, 2020, pp. 1-7.
Office Communication for U.S. Appl. No. 16/049,630 dated Oct. 15, 2020, pp. 1-16.
Office Communication for U.S. Appl. No. 16/983,978 dated Oct. 27, 2020, pp. 1-13.
International Search Report and Written Opinion for Application No. PCT/US2020/048806 dated Nov. 17, 2020, pp. 1-15.
Office Communication for U.S. Appl. No. 16/673,852 dated Nov. 25, 2020, pp. 1-8.
Office Communication for U.S. Appl. No. 16/846,670 dated Nov. 25, 2020, pp. 1-13.
U.S. Appl. No. 16/743,672, filed Oct. 10, 2018, pp. 1-278.
Office Communication for U.S. Appl. No. 17/306,361 dated Sep. 9, 2022, pp. 1-7.
Office Communication for U.S. Appl. No. 17/576,832 dated Sep. 23, 2022, pp. 1-5.
Office Communication for U.S. Appl. No. 17/306,361 dated Sep. 27, 2022, pp. 1-7.
Office Communication for U.S. Appl. No. 17/379,813 dated Oct. 5, 2022, pp. 1-11.
Office Communication for U.S. Appl. No. 17/217,882 dated Oct. 13, 2022, pp. 1-14.
Office Communication for U.S. Appl. No. 17/397,442 dated Oct. 27, 2022, pp. 1-8.
Office Communication for U.S. Appl. No. 17/859,632 dated Oct. 27, 2022, pp. 1-12.
International Search Report and Written Opinion for International Patent Application No. PCT/US2022/036381 dated Oct. 25, 2022, pp. 1-8.
Office Communication for U.S. Appl. No. 16/358,112 dated May 15, 2019, pp. 1-17.
Yurduseven, Okan et al., "Dual-Polarization Printed Holographic Multibeam Metasurface Antenna" Aug. 7, 2017, IEEE Antennas and Wireless Propagation Letters. pp. 10.1109/LAWP.2017, pp. 1-4.
Gao, S.S. et al., "Holographic Artificial Impedance Surface Antenna Based on Circular Patch", 2018 International Conference on Microwave and Millimeter Wave Technology (ICMMT), 2018, pp. 1-9.
Nishiyama,Eisuke et al., "Polarization Controllable Microstrip Antenna using Beam Lead PIN Diodes", 2006 Asia-Pacific Microwave Conference, 2006, pp. 1-4.
U.S. Appl. No. 62/743,672, filed Oct. 10, 2018, pp. 1-278.
Office Communication for U.S. Appl. No. 17/203,255 dated Apr. 26, 2022, pp. 1-17.
Office Communication for U.S. Appl. No. 17/177,131 dated Apr. 27, 2022, pp. 1-14.
International Search Report and Written Opinion for International Patent Application No. PCT/US2022/012613 dated May 10, 2022, pp. 1-8.
International Search Report and Written Opinion for International Patent Application No. PCT/US2022/013942 dated May 10, 2022, pp. 1-8.
Qualcomm Incorporated, "Common understanding of repeaters," 3GPP TSG RAN WG4 #98_e R4-2102829, 2021, https://www.3gpp.org/ftp/tsg_ran/WG4_Radio/TSGR4_98_e/Docs/R4-2102829.zip, Accessed: May 25, 2022, pp. 1-2.
MediaTek Inc., "General views on NR repeater," 3GPP TSG RAN WG4 #98_e R4-2101156, 2021, https://www.3gpp.org/ftp/tsg_ran/WG4_Radio/TSGR4_98_e/Docs/R4-2101156.zip, Accessed: May 25, 2022, pp. 1-4.
Office Communication for U.S. Appl. No. 17/177,145 dated Jun. 3, 2022, pp. 1-5.
Office Communication for U.S. Appl. No. 17/576,832 dated Jul. 13, 2022, pp. 1-15.
Office Communication for U.S. Appl. No. 17/585,418 dated Jul. 22, 2022, pp. 1-6.
Office Communication for U.S. Appl. No. 17/585,418 dated Aug. 4, 2022, pp. 1-2.
Office Communication for U.S. Appl. No. 17/112,940 dated Aug. 9, 2021, pp. 1-20.
International Search Report and Written Opinion for International Patent Application No. PCT/US2021/034479 dated Aug. 10, 2021, pp. 1-7.
Office Communication for U.S. Appl. No. 17/332,136 dated Sep. 2, 2021, pp. 1-9.
Office Communication for Chinese Patent Application No. 201980019925.1 dated Sep. 27, 2021, pp. 1-25.
Office Communication for U.S. Appl. No. 17/177,145 dated Oct. 14, 2021, pp. 1-5.
International Search Report and Written Opinion for International Patent Application No. PCT/US2021/043308 dated Nov. 2, 2021, pp. 1-8.
Office Communication for U.S. Appl. No. 17/177,131 dated Nov. 12, 2021, pp. 1-5.
Extended European Search Report for European Patent Application No. 19772471.9 dated Nov. 8, 2021, pp. 1-8.
Office Communication for U.S. Appl. No. 17/177,145 dated Nov. 16, 2021, pp. 1-16.
Office Communication for U.S. Appl. No. 17/177,131 dated Dec. 17, 2021, pp. 1-14.
Black, Eric J., "Holographic Beam Forming and MIMO," Pivotal Commware, 2017, pp. 1-8.
Björn, Ekman, "Machine Learning for Beam Based Mobility Optimization in NR," Master of Science Thesis in Communication Systems, Department of Electrical Engineering, Linköping University, 2017, pp. 1-85.
Office Communication for U.S. Appl. No. 17/112,940 dated Dec. 22, 2021, pp. 1-15.
International Search Report and Written Opinion for International Patent Application No. PCT/US2021/049502 dated Dec. 14, 2021, pp. 1-8.
Office Communication for U.S. Appl. No. 17/469,694 dated Jan. 20, 2022, pp. 1-9.
Office Communication for U.S. Appl. No. 16/983,927 dated Jan. 6, 2021, pp. 1-8.
Office Communication for U.S. Appl. No. 16/846,670 dated Feb. 8, 2021, pp. 1-4.

(56) References Cited

OTHER PUBLICATIONS

Office Communication for U.S. Appl. No. 16/983,978 dated Feb. 10, 2021, pp. 1-11.
Office Communication for U.S. Appl. No. 16/846,670 dated Apr. 2, 2021, pp. 1-9.
Office Communication for U.S. Appl. No. 16/730,690 dated Apr. 8, 2021, pp. 1-11.
Office Communication for U.S. Appl. No. 17/177,131 dated Apr. 9, 2021, pp. 1-17.
Vu, Trung Kien et al., "Joint Load Balancing and Interference Mitigation in 5G Heterogeneous Networks," IEEE Transactions on Wireless Communications, 2017, vol. 16, No. 9, pp. 6032-6046.
Office Communication for U.S. Appl. No. 17/177,145 dated Apr. 19, 2021, pp. 1-11.
Office Communication for U.S. Appl. No. 17/112,940 dated Jul. 21, 2021, pp. 1-22.
International Search Report and Written Opinion for International Patent Application No. PCT/US2021/026400 dated Jul. 20, 2021, pp. 1-7.
Office Communication for U.S. Appl. No. 17/177,145 dated Aug. 3, 2021, pp. 1-16.
Office Communication for U.S. Appl. No. 17/177,131 dated Aug. 6, 2021, pp. 1-16.
Office Communication for U.S. Appl. No. 17/537,233 dated Feb. 4, 2022, pp. 1-9.
Office Communication for U.S. Appl. No. 17/112,940 dated Mar. 17, 2022, pp. 1-16.
Office Communication for U.S. Appl. No. 17/576,832 dated Mar. 18, 2022, pp. 1-15.
Office Communication for U.S. Appl. No. 17/177,145 dated Mar. 24, 2022, pp. 1-18.
Office Communication for U.S. Appl. No. 17/306,361 dated Mar. 28, 2022, pp. 1-7.
Extended European Search Report for European Patent Application No. 19844867.2 dated Mar. 30, 2022, pp. 1-16.
Office Communication for U.S. Appl. No. 17/576,832 dated Apr. 1, 2022, pp. 1-14.
Office Communication for U.S. Appl. No. 17/585,418 dated Apr. 8, 2022, pp. 1-9.
Office Communication for U.S. Appl. No. 17/537,233 dated Apr. 20, 2022, pp. 1-9.
Extended European Search Report for European Patent Application No. 20759272.6 dated Nov. 3, 2022, pp. 1-9.
Office Communication for U.S. Appl. No. 17/334,105 dated Nov. 30, 2022, pp. 1-7.
Office Communication for U.S. Appl. No. 17/576,832 dated Dec. 15, 2022, pp. 1-15.
Falconer, David D. et al., "Coverage Enhancement Methods for LMDS," IEEE Communications Magazine, Jul. 2003, vol. 41, Iss. 7, pp. 86-92.
Office Communication for U.S. Appl. No. 17/708,757 dated Jan. 20, 2023, pp. 1-5.
Office Communication for U.S. Appl. No. 17/379,813 dated Feb. 3, 2023, pp. 1-10.

\* cited by examiner

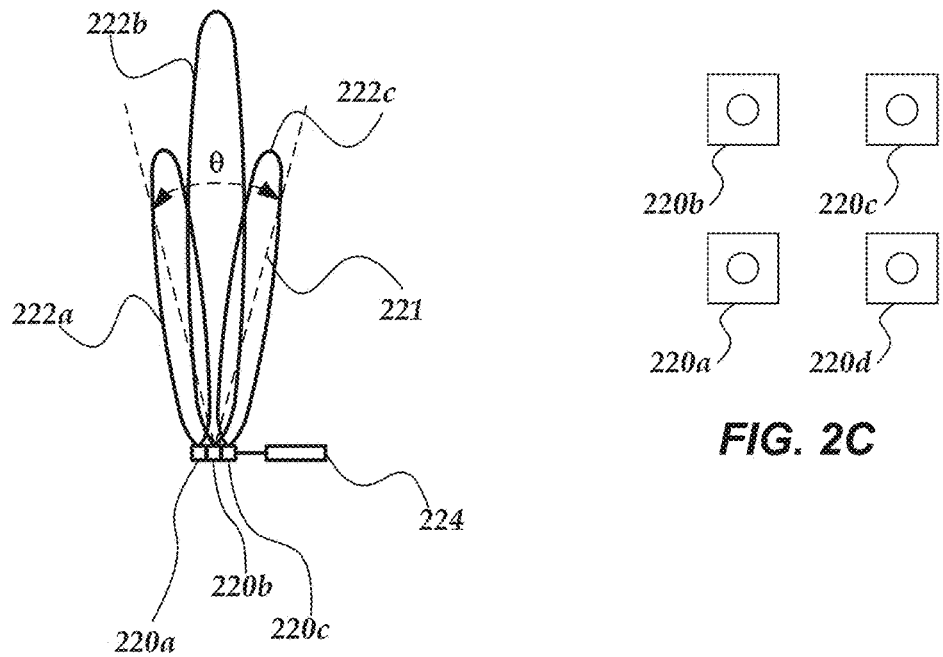
FIG. 2B
FIG. 2C
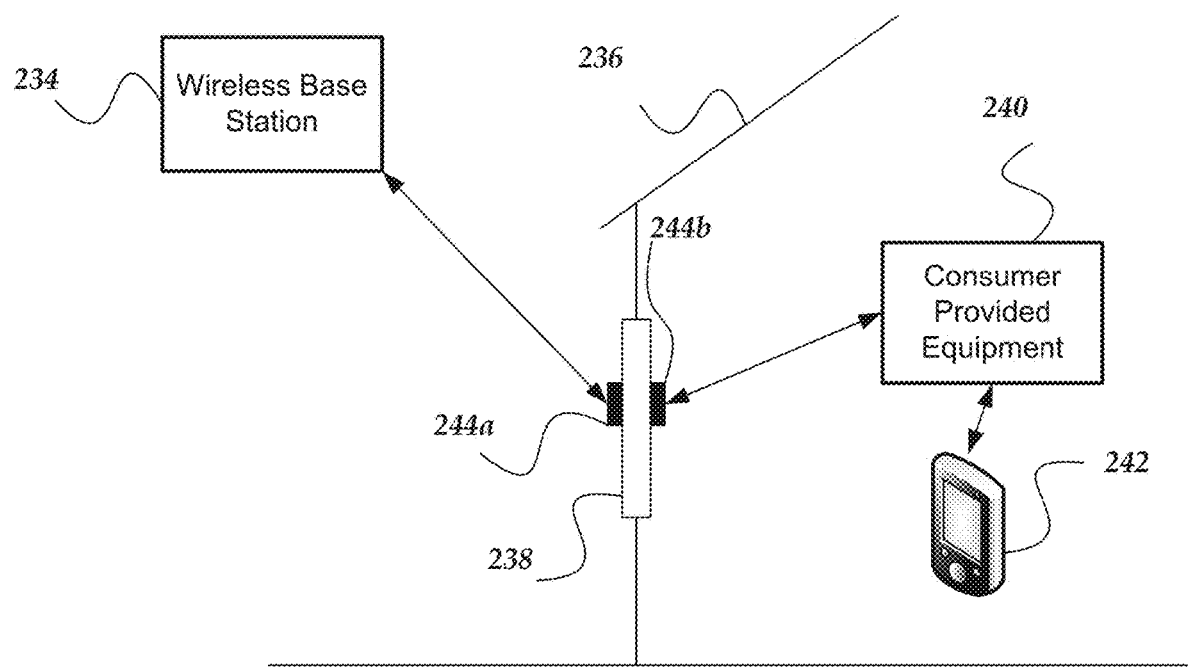
FIG. 2D

REFLECTOR

RELAY

RELAY

BASE STATION PROXY

BASE STATION PROXY

COMMUNICATION OF WIRELESS SIGNALS THROUGH PHYSICAL BARRIERS

CROSS-REFERENCE TO RELATED APPLICATIONS

This Utility Patent Application is a Continuation of U.S. patent application Ser. No. 16/730,932 filed on Dec. 30, 2019, now U.S. Pat. No. 10,863,458 issued on Dec. 8, 2020, which is a Continuation of U.S. patent application Ser. No. 16/568,096 filed on Sep. 11, 2019, now U.S. Pat. No. 10,524,216 issued on Dec. 31, 2019, which is a Continuation of U.S. patent application Ser. No. 16/358,112 filed on Mar. 19, 2019, now U.S. Pat. No. 10,425,905 issued on Sep. 24, 2019, which is based on previously filed U.S. Provisional Patent Application Ser. No. 62/645,004 filed on Mar. 19, 2018, and U.S. Provisional Patent Application Ser. No. 62/730,497 filed on Sep. 12, 2018, the benefits of which are claimed under 35 U.S.C. § 119(e) and § 120, and the contents of which are each further incorporated in entirety by reference.

TECHNICAL FIELD

The invention relates generally to employing one or more antennas placed on an exterior surface of a barrier, such as a window of a structure, to improve wireless communications between a radio system outside the barrier and a user device inside the barrier. Further, in some embodiments, the antenna is wirelessly coupled to an amplifier placed on an interior surface of the barrier that enables wireless communication with a user located within the structure.

BACKGROUND

Mobile devices have become the primary mode of wireless communication for the vast majority of people worldwide. In the first few generations of wireless communication networks, mobile devices were generally used for voice communication, text messages, and somewhat limited internet access. Newer generations of wireless communication networks have increased bandwidth and lowered latency enough to provide substantially more services to mobile device users, such as purchasing products, paying invoices, streaming movies, playing video games, online learning, dating, and more. Also, for each new generation of wireless communication network, the frequency and strength of the wireless signals are generally increased to provide even more bandwidth with less latency.

Unfortunately, the higher a frequency of a wireless signal, the greater the attenuation of wireless signals passing through physical barriers such as glass windows or walls of a structure. Moreover, since the recent rollout of $5^{th}$ generation (5G) wireless communication networks that can use wireless signals with millimeter waveforms at gigahertz frequencies, it has become even more difficult to provide access to these 5G wireless networks for mobile devices located behind physical barriers.

BRIEF DESCRIPTION OF THE DRAWINGS

FIG. 2B shows a side view of another embodiment of an exemplary arrangement of multiple instances of HMAs;

FIG. 2C shows a top view of yet another embodiment of an exemplary arrangement of multiple instances of HMAs;

FIG. 2D illustrates a schematic view of a wireless signal base station communicating with one or more HMAs disposed on an outside surface of a window of a structure and the wireless signals are communicated, by electronic components disposed on an inside surface of the window of the structure, to a customer premises equipment device disposed inside the structure and which communicates the wireless signals to one or more wireless computing devices;

FIG. 3F illustrates an embodiment of a configuration of external antenna 392 formed from an HMA that provides separate vertical and horizontal polarization for both uplink and downlink RF signals;

FIG. 3G shows an embodiment of a configuration of external antenna 393 formed from an HMA that provides combined vertical and horizontal polarization for both uplink and downlink RF signals;

FIG. 3H illustrates an embodiment of a configuration of external antenna 394 formed from patch antennas that provide combined vertical and horizontal polarization and combined uplink and downlink communication for RF signals;

DETAILED DESCRIPTION OF THE EMBODIMENTS

Figure 1A:
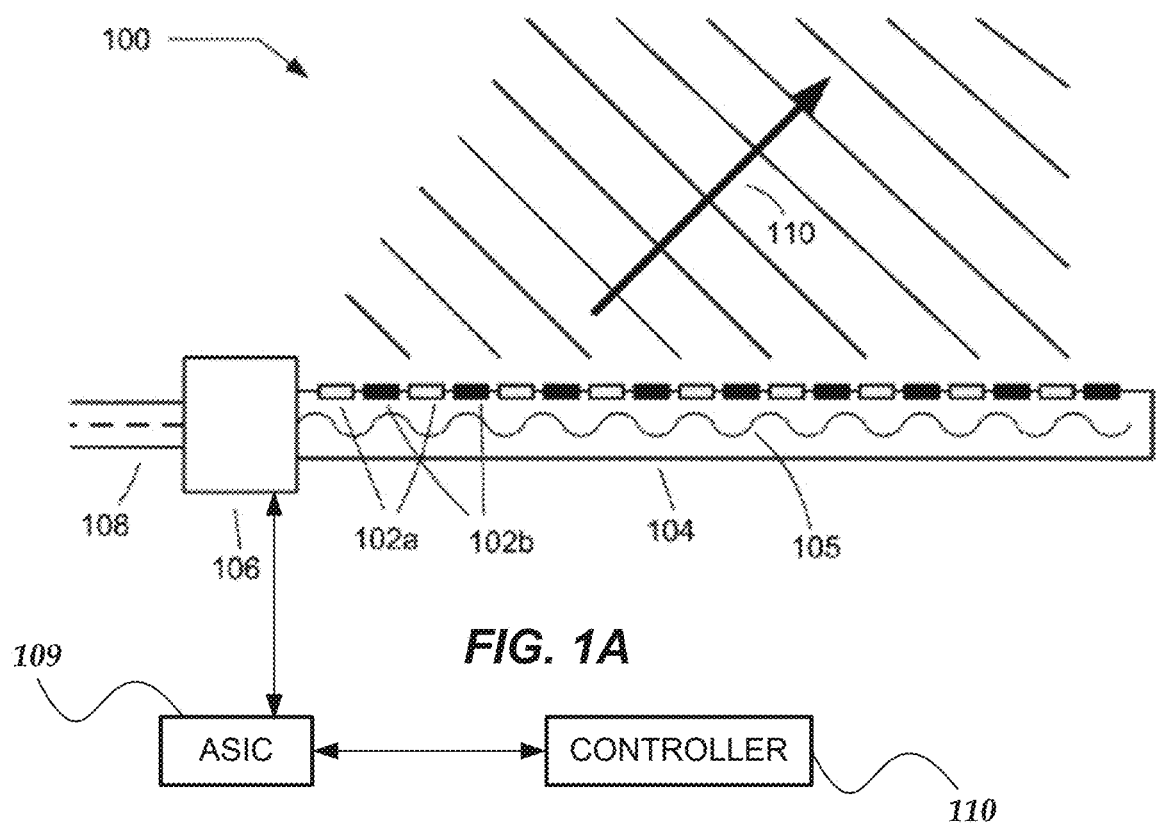
FIG. 1A shown an embodiment of an exemplary surface scattering antenna with multiple varactor elements arranged to propagate electromagnetic waves in such a way as to form an exemplary instance of holographic metasurface antennas (HMA)

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Similarly, the phrase "in another embodiment" as used herein does not necessarily refer to a different embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments of the invention are directed to a method, apparatus, or a system that employs an electronic RF communication device that provides for the communication of radio frequency (RF) wireless signals through a physical barrier, such as walls or windows, between one or more remote wireless base stations and one or more customer premises equipment (CPE) devices and/or other wireless computing devices located behind the physical barrier. In one or more embodiments, the RF wireless signals are millimeter waveforms communicated at gigahertz frequencies that are communicated with $5^{th}$ Generation (5G) communication protocols by one or more remote wireless base station nodes located external to the one or more wireless computing devices located behind the physical barrier.

In one or more embodiments, the RF communication device includes one or more external (externally facing) antennas that communicate upload and download RF wireless signals with remotely located wireless base stations and one or more internal antennas (internally facing) that communicate the upload and download RF wireless signals with the CPE.

Also, in one or more embodiments, one or more amplifiers may include a bi-static amplifier that simultaneously provides continuous separately selectable gains to upload RF wireless signals and download RF wireless signals. The bi-static amplifier may be configured to employ separate upload and download amplifiers to separately provide a separately selectable gain to the upload RF wireless signal as it is radiated by the exterior antenna and another separately selectable gain to the download RF wireless signal as it is radiated by the interior antenna to the CPE.

Also, in yet other embodiments, the one or more amplifiers may include a bi-directional amplifier that provides separately selectable gains to the upload and download RF wireless signals by timing continuous switching between components employed in a common communication path for the upload and download RF wireless signals. The continuous switching may be staggered to provide isolation of the upload and download RF wireless signals while sharing the common communication path. In one or more embodiments, RF couplers (e.g., patch antennas, glass field couplers, or the like), are configured to communicate the download and upload RF wireless signals through the barrier to provide a communication channel when the one or more exterior antennas are located on an exterior surface of the barrier and one or more internal antennas are located on an interior surface of the barrier.

In one or more embodiments, the customer premises equipment (CPE) may be any terminal device and/or associated communication equipment located at a customer's location and/or premises and can provide communication over one or more telecommunication channels provided by a telecommunication carrier. The CPE is typically established at a location in a structure separate from other communication equipment provided by a carrier or some other communication service provider. The CPE may include one or more IP telephones, mobile phones, routers, network switches, residential gateways, set top television boxes, home network adapters, or the like.

Additionally, in one or more embodiments, when a bi-static amplifier is employed to provide continuous and separate gain to the upload RF wireless signal, changes in a strength (value) of the power of the upload RF signal can be monitored to determine when the CPE is communicating with an authorized remote wireless base station. In one or more embodiments, an RF power detector circuit may be employed to continuously measure a value of the power output of the upload RF signal. A greater the strength (value) of the RF power for the RF upload wireless signals in the presence of download RF wireless signals, the greater a likelihood that the CPE is currently communicating with an authorized wireless base station.

In one or more embodiments, the bi-static download amplifier continuously amplifies and radiates received radio frequency signals from any remote wireless base station to the CPE, which is unaware of the presence of the RF communication device. In this case, the CPE responds with an upload RF wireless signal to just those download RF wireless signals that were radiated by a remote wireless base station that is authorized for communication with that particular CPE. However, in one or more other embodiments, when the CPE is either aware of or incorporated into the RF communication device, the CPE could provide feedback as to a quality of the download RF signal which could be employed to optimize a gain of the download RF signal.

Additionally, in one or more embodiments, one or more thresholds or range of thresholds may be employed to determine when a value/strength of the measured RF power output is sufficient to indicate current communication between the CPE and an authorized remote wireless base station.

Also, in one or more embodiments, the one or more amplifiers may be located on an exterior side of the barrier, on an interior side of the barrier, or split between the exterior and interior sides of the barrier. Also, in one or more embodiments, no gain may be provided for the download RF signal and/or the upload RF signal when the CPE is directly integrated with the RF communication device.

In one or more embodiments, the CPE is directly integrated and combined with the RF communication device. The integration of the CPE with the RF communication device may reduce power consumption, number of electronic components, decrease cost, and increase reliability.

In one or more embodiments, the CPE may directly communicate the upload RF signals with the external antenna (when integrated together with the RF communication device). Also, in one or more embodiments, the RF communication device may relay the communicate RF signals to another communication device disposed inside a structure that further relays the RF signals to the CPE.

In one or more embodiments, the CPE may transform the communicated RF signals into other RF signals that employ one or more other wireless communication protocols which are compatible with one or more wireless communication devices, (e.g., mobile devices) that are disposed inside a structure, behind a barrier, or within a vehicle. Additionally, in one or more embodiments, the CPE may transform the communicated wireless signals into wired signals that are communicated to one or more wired devices disposed behind the barrier, or inside the structure. These wired signals may be communicated in any wired communication protocol to the one or more wired devices, including ethernet, coaxial cable, infrared, optical fiber, or the like.

Additionally, in one or more embodiments, one or more internal antennas are provided to communicate the wireless signals inside the structure to one or more CPEs that are not integrated into the RF communication device. Further, in one or more embodiments, one or more CPEs may be provided to boost, provide, and/or repeat the RF wireless signals communicated by the RF communication device's one or more internal antennas using any wireless or wired communication protocols.

Also, in one or more embodiments, depending on a level of the integration of the CPE with the RF communication device, one or more of the RF couplers, one or more amplifiers, and/or internal antennas may be eliminated from the RF communication device. The integration of the CPE with the RF communication device may improve reliability and reduce physical size, component complexity, and/or cost by eliminating redundant functionality and components.

In one or more embodiments, all or most of the components for the RF communication device (optionally the CPE too) may be disposed on the exterior surface of the barrier, the interior surface of the barrier, or split between the interior and exterior surfaces of the barrier. Each of these different configurations of the RF communication device and the CPE are discussed below and shown in regard to FIGS. 2D, 2E and 2F.

Additionally, an advantage of one or more embodiments of the exemplary RF communication device is to not digitize the upload and download RF signals (analog signals) that are provided to the CPE. Instead, the upload and download RF signals are kept intact in the analog domain during communication between the one or more remote wireless signal base stations and the CPE. By not having to perform digital signal processing on the analog RF signals communicated between the remote wireless base stations and the CPEs, cost, component complexity, and energy consumption can be reduced. It is a noteworthy advantage that the one or more embodiments of the RF communication device do not require analog to digital converters, digital signal processors, digital components, frequency processors, or the like to communicate the upload and download RF wireless signals between the remote wireless base stations and the CPE.

Additionally, although not shown, one or more of the embodiments of the RF communication device may also be applied to other types of barriers than windows, such as walls made of one or more types of materials, e.g., wood, concrete, composite materials, and metal. For these other embodiments used with other types of barriers, the RF couplers may be employ one or more different types of technology including, near field devices, induction devices, or the like, to communicate the RF signals through one or more barriers.

In one or more embodiments, a location device may be included in the RF communication device. The location device may include a gyroscope, accelerometer, GPS device, and the like to detect an orientation, movement, and/or location of the communication device.

In one or more embodiments, a wireless interface may be included in the RF communication device to communicate with an analysis and control application executing on a wireless device, such as a mobile phone, tablet, or notebook computer, which is employed by an authorized user (e.g., customer, administrator or technician) physically positioned near (local) to the RF communication device. The wireless interface may provide communication employing one or more different wireless communication protocols, such as Bluetooth, Bluetooth LE, Zigbee, WiFi, or the like. Further, in one or more embodiments, the application may provide different types of information regarding the operation of the communication device, metrics, notifications, troubleshooting tips, software updates, strength of upload and download RF signal, alerts, restart controls, RF signal scanning controls, user permissions, metrics, or the like.

In one or more embodiments, components of the external antenna may be protected with a protective cover, such as a radome, is employed. In one or more embodiments, the radome is formed of a material that enables communication of RF signals without a significant reduction in gain, such as plastic, fiberglass, resin, composite materials, or the like. Further, in one or more embodiments, a wide angle impedance match (WAIM) material may be incorporated with the radome to improve a range of phase angles at which the external antenna may provide gain to communicated RF signals. In one or more embodiments, the WAIM material may be positioned on an inside surface and/or an outside surface of the radome. Further, in one or more embodiments, at least a portion of the radome may be formed from the WAIM material itself. See a representation of the gain versus angle relationship for radome, radome with WAIM, and no radome in FIG. 3J.

In one or more embodiments, when separate arrays of two to four patch antennas are positioned on opposite sides of a glass window are employed as an RF coupler for the communication device, the exterior arrays of patch antennas for upload and download RF signals may be physically slanted between 35 to 60 degrees from an orientation of the corresponding arrays of interior patch antennas. In this way, the arrays of interior and exterior patch antennas can improve their impedance matching for the wave front of the upload and download RF signals communicated through the glass window, which results in less loss of gain in the RF signals.

In one or more embodiments, an RF isolation spacer may be provided between arrays of patch antennas employed by the RF coupler on the exterior surface of the barrier for communicating the upload and download RF signals across a barrier, such as a glass window. The RF isolation spacer may be formed from one or more different types of RF absorbent materials. Exemplary RF absorbent materials may include rubberized foam impregnated with controlled mixtures of carbon and/or iron that may be configured in pyramidal shapes, or flat plates of ferrite material. Also, separate cutouts (ports) are provided for the upload and download patch antennas arrays the RF signals between the exterior and interior surfaces of the barrier. Additionally, slits may be formed in the RF isolation spacer to further isolate and breakup coupling between the upload and download RF signals. See FIG. 11D.

In one or more embodiments, one or more inductive charge (magnetic loop) couplers are positioned on both sides of the interior and exterior surfaces of the window barrier. The one or more inductive charge couplers may be connected to an electrical power source, such as one or more of a fixed electrical connection, a removable electrical connection, a battery, a solar cell, or the like. Further, electrical power may be provided by the one or more inductive couplers to one or more of the one or more external antennas, the one or more RF couplers, the one or more amplifiers, the one or more internal antennas, location devices, local wireless interfaces, processing components, or customer premises equipment. Also, for one or more embodiments, the electrical power may be provided directly to the one or more amplifiers, the one or more internal antennas, or customer premises equipment by a fixed electrical connection to a power source, a removable electrical connection to a power source, a battery, a solar cell, inductive charge coupler, or the like.

In one or more embodiments, different RF wireless signals may be communicated by the one or more base station nodes using different types of wireless communication protocols, such as 5G, 4G, 3G, 2G, LTE, TDMA, GPRS, CDMA, GSM, WiFi, WiMax, or the like. Also, these different types of wireless communication protocols may be employed for different types of services. For example, wireless signals employed to control one or more operations of the one or more external antennas, the one or more glass field couplers, the one or more amplifiers, the one or more internal antennas, or customer premises equipment may not require significant bandwidth or speed. Thus, these control operations may be communicated by 4G, or less, communication protocols which can reduce energy consumption, and/or save costs.

In one or more embodiments, the structure be an office building, shopping center, sports stadium, residence, school, factory, library, theater, or the like.

Also, in one or more embodiments, the external antennas and/or internal antennas are holographic beam forming antennas, such as one or more holographic metasurface antennas (HMAs) or the like. An HMA may use an arrangement of controllable elements to produce an object wave. Also, in one or more embodiments, the controllable elements may employ individual electronic circuits that have two or more different states. In this way, an object wave can be modified by changing the states of the electronic circuits for one or more of the controllable elements. A control function, such as a hologram function, can be employed to define a current state of the individual controllable elements for a particular object wave. In one or more embodiments, the hologram function can be predetermined or dynamically created in real time in response to various inputs and/or conditions. In one or more embodiments, a library of predetermined hologram functions may be provided. In the one or more embodiments, any type of HMA can be used to that is capable of producing the beams described herein.

Illustrated Operating Environment

FIG. 1A illustrates one embodiment of an HMA which takes the form of a surface scattering antenna 100 (i.e., a HMA) that includes multiple scattering elements 102a, 102b that are distributed along a wave-propagating structure 104 or other arrangement through which a reference wave 105 can be delivered to the scattering elements. The wave propagating structure 104 may be, for example, a microstrip, a coplanar waveguide, a parallel plate waveguide, a dielectric rod or slab, a closed or tubular waveguide, a substrate-integrated waveguide, or any other structure capable of supporting the propagation of a reference wave 105 along or within the structure. A reference wave 105 is input to the wave-propagating structure 104. The scattering elements 102a, 102b may include scattering elements that are embedded within, positioned on a surface of, or positioned within an evanescent proximity of, the wave-propagation structure 104. Examples of such scattering elements include, but are not limited to, those disclosed in U.S. Pat. Nos. 9,385,435; 9,450,310; 9,711,852; 9,806,414; 9,806,415; 9,806,416; and 9,812,779 and U.S. Patent Applications Publication Nos. 2017/0127295; 2017/0155193; and 2017/0187123, all of which are incorporated herein by reference in their entirety. Also, any other suitable types or arrangement of scattering elements can be used.

The surface scattering antenna may also include at least one feed connector 106 that is configured to couple the wave-propagation structure 104 to a feed structure 108 which is coupled to a reference wave source (not shown). The feed structure 108 may be a transmission line, a waveguide, or any other structure capable of providing an electromagnetic signal that may be launched, via the feed connector 106, into the wave-propagating structure 104. The feed connector 106 may be, for example, a coaxial-to-microstrip connector (e.g. an SMA-to-PCB adapter), a coaxial-to-waveguide connector, a mode-matched transition section, etc.

The scattering elements 102a, 102b are adjustable scattering elements having electromagnetic properties that are adjustable in response to one or more external inputs. Adjustable scattering elements can include elements that are adjustable in response to voltage inputs (e.g. bias voltages for active elements (such as varactors, transistors, diodes) or for elements that incorporate tunable dielectric materials (such as ferroelectrics or liquid crystals)), current inputs (e.g. direct injection of charge carriers into active elements), optical inputs (e.g. illumination of a photoactive material), field inputs (e.g. magnetic fields for elements that include nonlinear magnetic materials), mechanical inputs (e.g. MEMS, actuators, hydraulics), or the like. In the schematic example of FIG. 1A, scattering elements that have been adjusted to a first state having first electromagnetic properties are depicted as the first elements 102a, while scattering elements that have been adjusted to a second state having second electromagnetic properties are depicted as the second elements 102b. The depiction of scattering elements having first and second states corresponding to first and second electromagnetic properties is not intended to be limiting: embodiments may provide scattering elements that are discretely adjustable to select from a discrete plurality of states corresponding to a discrete plurality of different electromagnetic properties, or continuously adjustable to select from a continuum of states corresponding to a continuum of different electromagnetic properties.

In the example of FIG. 1A, the scattering elements 102a, 102b have first and second couplings to the reference wave 105 that are functions of the first and second electromagnetic properties, respectively. For example, the first and second couplings may be first and second polarizabilities of the scattering elements at the frequency or frequency band of the reference wave. On account of the first and second couplings, the first and second scattering elements 102a, 102b are responsive to the reference wave 105 to produce a plurality of scattered electromagnetic waves having amplitudes that are functions of (e.g. are proportional to) the respective first and second couplings. A superposition of the scattered electromagnetic waves comprises an electromagnetic wave that is depicted, in this example, as an object wave 110 that radiates from the surface scattering antenna 100.

FIG. 1A illustrates a one-dimensional array of scattering elements 102a, 102b. It will be understood that two- or three-dimensional arrays can also be used. In addition, these arrays can have different shapes. Moreover, the array illustrated in FIG. 1A is a regular array of scattering elements 102a, 102b with equidistant spacing between adjacent scattering elements, but it will be understood that other arrays may be irregular or may have different or variable spacing between adjacent scattering elements. Also, Application Specific Integrated Circuit (ASIC) 109 is employed to control the operation of the row of scattering elements 102a and 102b. Further, controller 110 may be employed to control the operation of one or more ASICs that control one or more rows in the array.

Figure 1B:
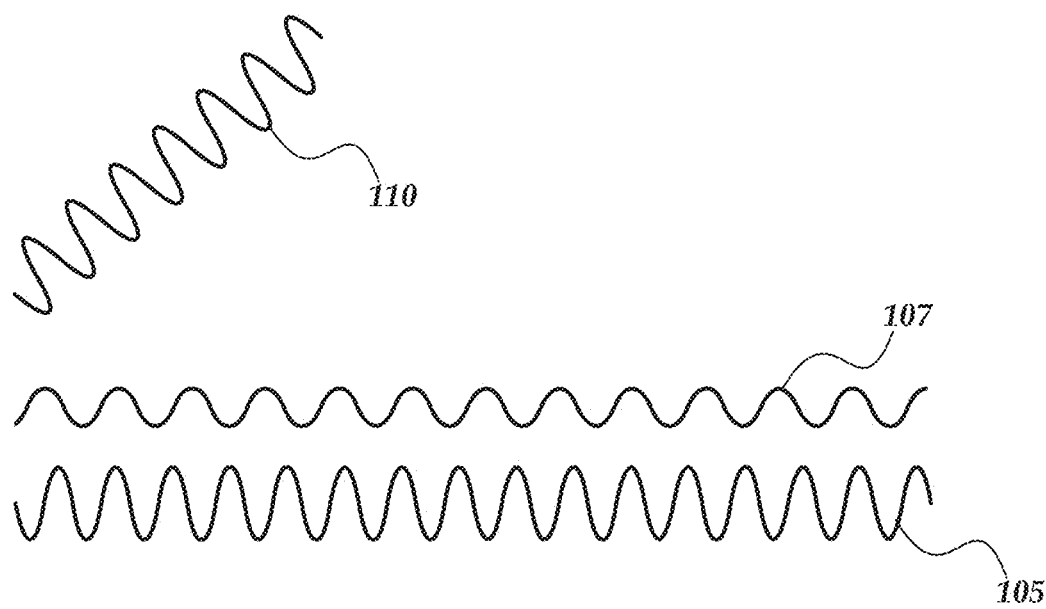
FIG. 1B shows a representation of one embodiment of a synthetic array illustrating a reference waveform and a hologram waveform (modulation function) that in combination provide an object waveform of electromagnetic waves.
Figure 1C:
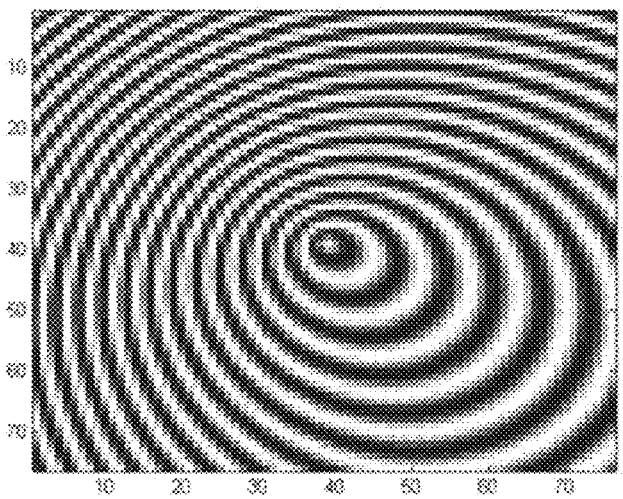
FIG. 1C shows an embodiment of an exemplary modulation function for an exemplary surface scattering antenna.
Figure 1D:
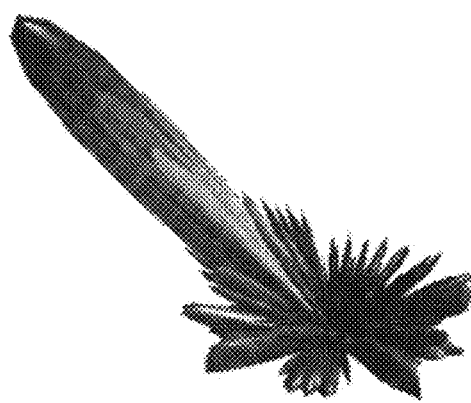
FIG. 1D shows an embodiment of an exemplary beam of electromagnetic waves generated by the modulation function of FIG. 1C.

The array of scattering elements 102a, 102b can be used to produce a far-field beam pattern that at least approximates a desired beam pattern by applying a modulation pattern 107 (e.g., a hologram function, H) to the scattering elements receiving the reference wave ($\psi_{ref}$) 105 from a reference wave source, as illustrated in FIG. 1B. Although the modulation pattern or hologram function 107 in FIG. 1B is illustrated as sinusoidal, it will be recognized non-sinusoidal functions (including non-repeating or irregular functions) may also be used. FIG. 1C illustrates one example of a modulation pattern and FIG. 1D illustrates one example of a beam generated using that modulation pattern.

In at least some embodiments, a computing system can calculate, select (for example, from a look-up table or database of modulation patterns) or otherwise determine the modulation pattern to apply to the scattering elements 102a, 102b receiving the RF energy that will result in an approximation of desired beam pattern. In at least some embodiments, a field description of a desired far-field beam pattern is provided and, using a transfer function of free space or any other suitable function, an object wave ($\psi_{obj}$) 110 at an antenna's aperture plane can be determined that results in the desired far-field beam pattern being radiated. The modulation function (e.g., hologram function) can be determined which will scatter the reference wave 105 into the object wave 110. The modulation function (e.g., hologram function) is applied to scattering elements 102a, 102b, which are excited by the reference wave 105, to form an approximation of an object wave 110 which in turn radiates from the aperture plane to at least approximately produce the desired far-field beam pattern.

In at least some embodiments, the hologram function H (i.e., the modulation function) is equal the complex conjugate of the reference wave and the object wave, i.e., $\psi_{ref}^* \psi_{obj}$. In at least some embodiments, the surface scattering antenna may be adjusted to provide, for example, a selected beam direction (e.g. beam steering), a selected beam width or shape (e.g. a fan or pencil beam having a broad or narrow beam width), a selected arrangement of nulls (e.g. null steering), a selected arrangement of multiple beams, a selected polarization state (e.g. linear, circular, or elliptical polarization), a selected overall phase, or any combination thereof. Alternatively, or additionally, embodiments of the surface scattering antenna may be adjusted to provide a selected near field radiation profile, e.g. to provide near-field focusing or near-field nulls.

The surface scattering antenna can be considered a holographic beamformer which, at least in some embodiments, is dynamically adjustable to produce a far-field radiation pattern or beam. In some embodiments, the surface scattering antenna includes a substantially one-dimensional wave-propagating structure 104 having a substantially one-dimensional arrangement of scattering elements. In other embodiments, the surface scattering antenna includes a substantially two-dimensional wave-propagating structure 104 having a substantially two-dimensional arrangement of scattering elements. In at least some embodiments, the array of scattering elements 102a, 102b can be used to generate a narrow, directional far-field beam pattern, as illustrated, for example, in FIG. 1C. It will be understood that beams with other shapes can also be generated using the array of scattering elements 102a, 102b.

In at least some of the embodiments, the narrow far-field beam pattern can be generated using a holographic metasurface antenna (HMA) and may have a width that is 5 to 20 degrees in extent. The width of the beam pattern can be determined as the broadest extent of the beam or can be defined at a particular region of the beam, such as the width at 3 dB attenuation. Any other suitable method or definition for determining width can be used.

A wider beam pattern (also referred to as a "radiation pattern") is desirable in a number of applications, but the achievable width may be limited by, or otherwise not available using, a single HMA. Multiple instances of HMAs can be positioned in an array of HMAs to produce a wider composite far-field beam pattern. It will be recognized, however, that the individual beam patterns from the individual HMAs will often interact and change the composite far-field beam pattern so that, at least in some instances, without employing the one or more embodiments of the invention, the simple combination of the outputs of multiple instances of HMAs produces a composite far-field beam pattern that does not achieve the desired or intended configuration.

Figure 2A:
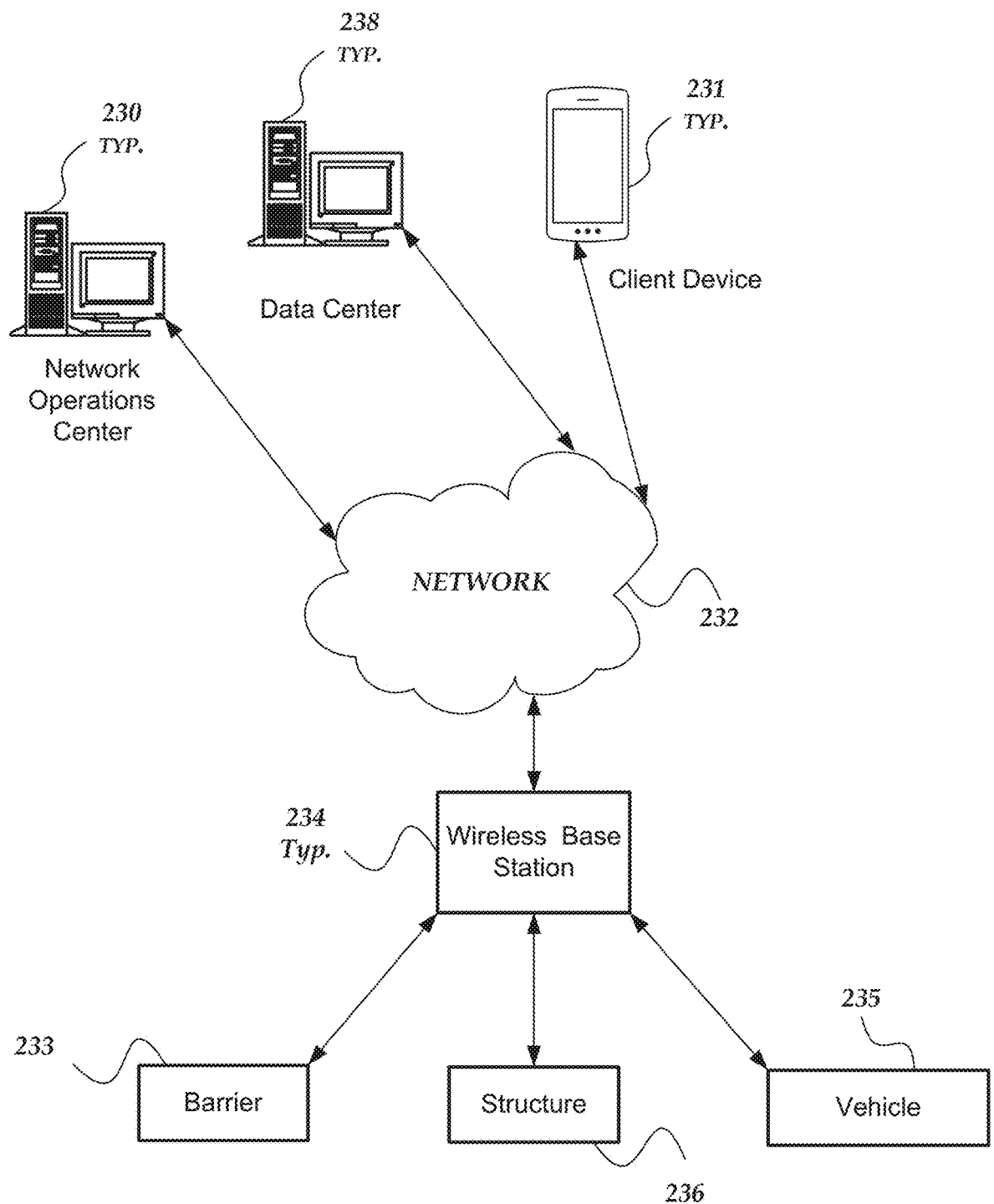
FIG. 2A shows a top view of an embodiment of an exemplary environment, including an arrangement of a network operations center, wireless signal base station, network and multiple structures, in which various embodiments of the invention may be implemented.

FIG. 2A illustrates an overview of system for communicating data from one or more data centers 238 which employs one or more network operations centers 230 to route the data to one or more wireless signal base stations that communicate the data in the form of wireless signals to one or more wireless communication devices (not shown). As shown, the data is communicated from one or more data centers 238 and routed in part by one or more NOCs 230 over network 232 to one or more wireless signal base stations 234 that wirelessly communicate the data with one or more different types of wireless communication devices (not shown) located inside one or more structures 236, behind barriers 233, within vehicles 235, or outside in an open space, such as a park, stadium, or open air theater. Also, one or more wireless client devices 231 are coupled to network 232 and may be employed to communicate data to the different types of wireless communication devices.

Network 232 may be configured to couple network operation center computers with other computing devices, including wireless base station 234. Network 232 may include various wired and/or wireless technologies for communicating with a remote device, such as, but not limited to, USB cable, Bluetooth®, Wi-Fi®, or the like. In some embodiments, network 232 may be a network configured to couple network computers with other computing devices. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or various combinations thereof. In various embodiments, network 232 may be enabled to employ various forms of communication technology, topology, computer-readable media, or the like, for communicating information from one electronic device to another. For example, network 232 can include—in addition to the Internet—LANs, WANs, Personal Area Networks (PANs), Campus Area Networks, Metropolitan Area Networks (MANs), direct communication connections (such as through a universal serial bus (USB) port), or the like, or various combinations thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ various ones of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, network 232 may include various communication technologies by which information may travel between computing devices.

Network 232 may, in some embodiments, include various wireless networks, which may be configured to couple various portable network devices, remote computers, wired networks, other wireless networks, or the like. Wireless networks may include various ones of a variety of sub-networks that may further overlay stand-alone ad-hoc networks, or the like, to provide an infrastructure-oriented connection for at least client computer. Such sub-networks may include mesh networks, Wireless LAN (WLAN) networks, cellular networks, or the like. In one or more of the various embodiments, the system may include more than one wireless network.

Network 232 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies.

In various embodiments, at least a portion of network 232 may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

FIG. 2B illustrates another arrangement of HMAs 220a, 220b, 220c that produce beams 222a, 222b, 222c where the middle beam 222b is substantially different in size and shape from the other two beams 222a, 222c. FIG. 2C illustrates, in a top view, yet another arrangement of HMAs 220a, 220b, 220c, 220d which form a two-dimensional array.

Also, one or more particular shapes of beam patterns, such as wide beam patterns, narrow beam patterns or composite beam patterns, may be desirable in a number of applications at different times for different conditions, but may not be practical or even available using a single HMA. In one or more embodiments, multiple instances of HMAs may be positioned in an array to produce a wide variety of composite, near-field, and/or far-field beam patterns without significant cancellation or signal loss. Since the object waves of multiple instances of HMAs may interfere with each other, adjustment to their object waves may be desirable to generate a beam pattern "closer" to the desired shape of a particular beam pattern. Any suitable methodology or metric can be used to determine the "closeness" of a beam pattern to a desired beam pattern including, but not limited to, an average deviation (or total deviation or sum of the magnitudes of deviation) over the entire beam pattern or a defined portion of the beam pattern from the desired beam pattern or the like.

In one of more embodiments, a physical arrangement of HMAs may be existing or can be constructed and coupled to a reference wave source. In one or more embodiments, a hologram function can be calculated, selected, or otherwise provided or determined for each of the HMAs. Each of the HMAs includes an array of dynamically adjustable scattering elements that have an adjustable electromagnetic response to a reference wave from the reference wave source. The hologram function for the HMA defines adjustments of the electromagnetic responses for the scattering elements of the HMA to produce an object wave that is emitted from the HMA in response to the reference wave. The object waves produced by the HMAs may be combined to produce a composite beam. Any suitable method or technique can be used to determine or provide any arrangement of HMAs to produce a composite beam, such as the exemplary composite beams illustrated in FIGS. 2B and 2C.

FIG. 2D illustrates an overview of remote wireless base station 234 communicating upload and download RF wireless signals with an RF communication device having one component 244a that includes an external antenna (employing one or more HMAs) attached to an exterior surface of window 238 in structure 236; and also having another component 244b that includes an internal antenna (may or may not employ HMAs) attached to an interior surface of window 238. The internal antenna communicates the upload and download RF wireless signals with one or more CPE devices 240 that further communicate with one or more wireless computing devices 242 and/or wired devices inside structure 236. Although not shown, the RF communication device may also include glass field couplers that are positioned on opposite sides of window 238 to wirelessly transmit and receive the RF wireless signals through the window. Also not shown, the RF communication device may include one or more amplifiers that may be provided to boost the upload and download RF wireless signals communicated through window 238 with remote base station 234. Further, the RF communication device may include inductive chargers (not shown) provide electrical power to the various components disposed on opposite sides of window 238.

Figure 2E:
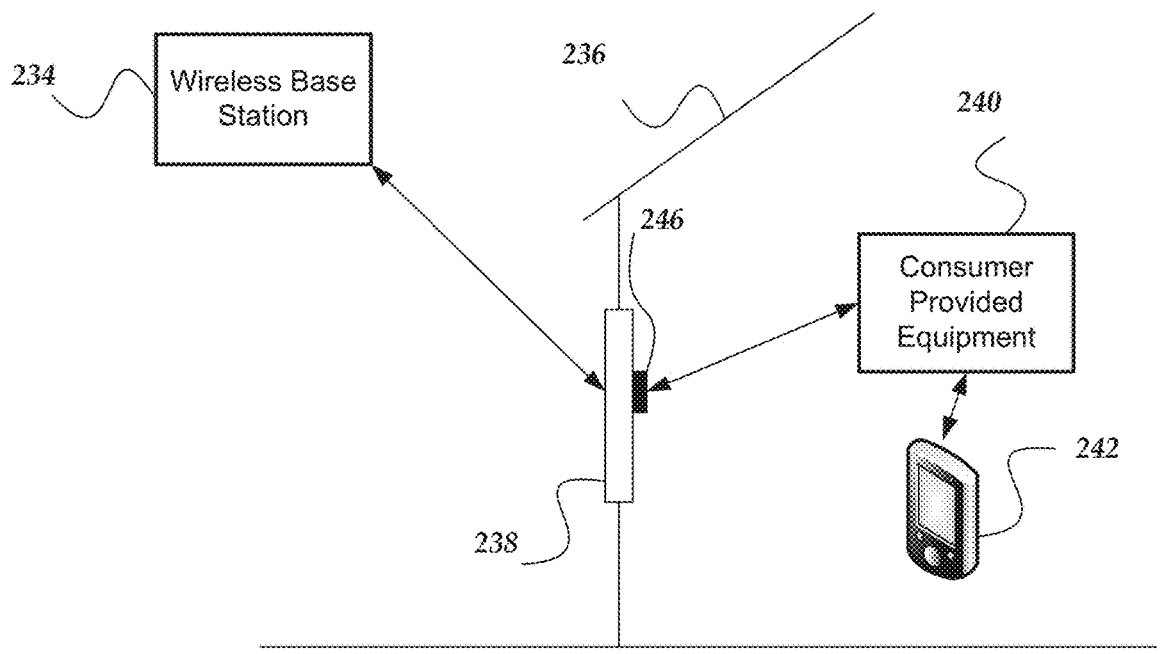
FIG. 2E shows a schematic view of a wireless signal base station communicating with one or more HMAs disposed on an inside surface of a window of a structure and the wireless signals are communicated, by electronic components disposed on the inside surface of the window, to a customer premises equipment device disposed inside the structure and which communicates the wireless signals to one or more wireless computing devices disposed inside the structure.

FIG. 2E shows a schematic view of remote wireless base station 234 communicating upload and download RF signals with an RF communication device 246 disposed on an interior surface of window 238 of structure 236. Although not shown, the RF communication device includes an external antenna that communicates the RF signals with remote base station 234. Also, an internal antenna is included to communicate the RF signals with one or more CPEs disposed inside structure 236. The CPE is configured to communicate with one or more wireless computing devices and/or wired devices (not shown) disposed inside structure 236. Further, inductive chargers (not shown) provide electrical power to the various components disposed on the interior surface of window 238.

Figure 2F:
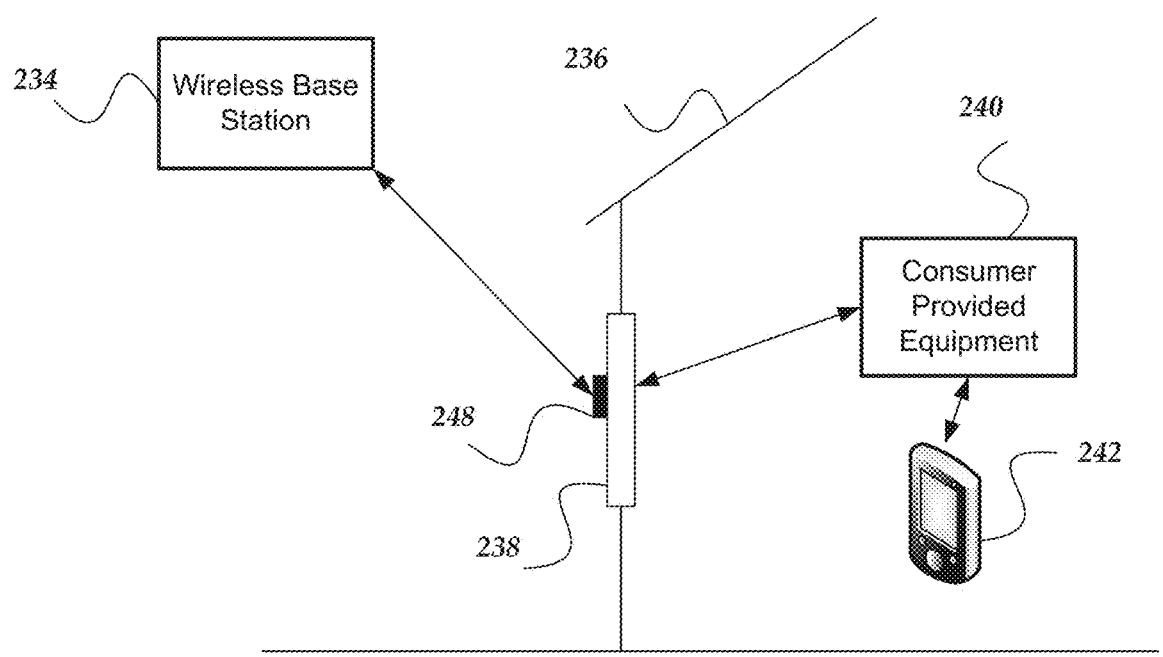
FIG. 2F illustrates a schematic view of a wireless signal base station communicating with one or more HMAs disposed on an exterior surface of a window of a structure and the wireless signals are communicated, by electronic components disposed on the exterior surface of the window, to a customer premises equipment device disposed inside the structure and which communicates the wireless signal to one and one or more wireless computing devices disposed inside the structure.

FIG. 2F illustrates a schematic view of remote wireless base station 234 communicating upload and download RF signals with an RF communication device 248 disposed on an exterior surface of window 238 of structure 236.

Although not shown, the RF communication device includes an external antenna that communicates the RF signals with remote base station 234. Also, an internal antenna is included to communicate the RF signals through window 238 to one or more CPEs disposed inside structure 236. The CPE is configured to communicate with one or more wireless computing devices and/or wired devices (not shown) disposed inside structure 236. Further, inductive chargers (not shown) provide electrical power to the various components disposed on the interior surface of window 238.

Illustrative Computer

Figure 3A:
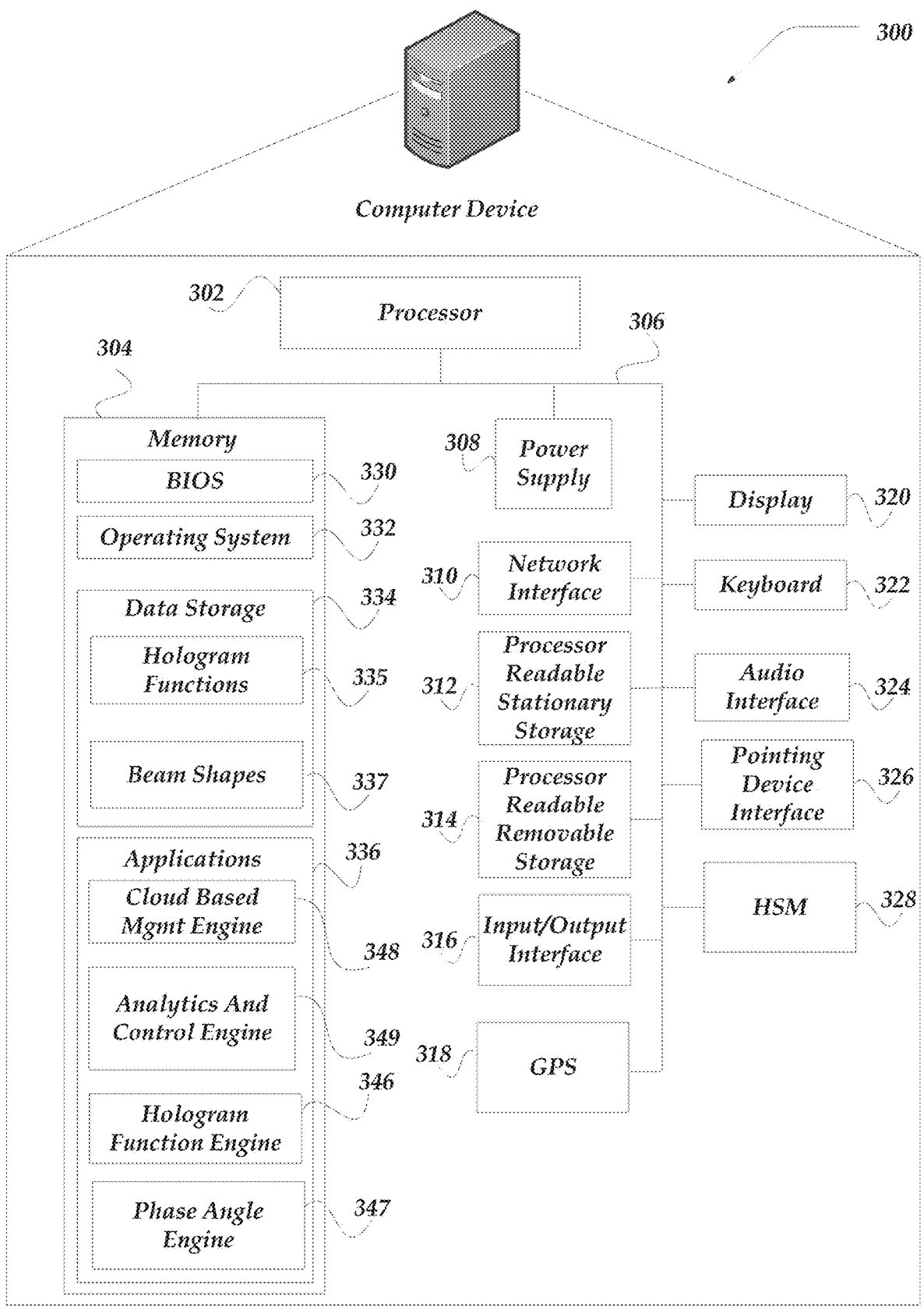
FIG. 3A shows an embodiment of an exemplary computer device that may be included in a system such as that shown in FIG. 2A.

FIG. 3A shows one embodiment of an exemplary computer device 300 that may be included in an exemplary system implementing one or more of the various embodiments. Computer device 300 may include many more or less components than those shown in FIG. 3A. However, the components shown are sufficient to disclose an illustrative embodiment for practicing these innovations. Computer device 300 may include a desktop computer, a laptop computer, a server computer, a client computer, and the like. Computer device 300 may represent, for example, one embodiment of one or more of a laptop computer, smartphone/tablet, computer device, controller of one or more HMAs, mobile device or may be part of the network operations center.

As shown in FIG. 3, computer device 300 includes one or more processors 302 that may be in communication with one or more memories 304 via a bus 306. In some embodiments, one or more processors 302 may be comprised of one or more hardware processors, one or more processor cores, or one or more virtual processors. In some cases, one or more of the one or more processors may be specialized processors or electronic circuits particularly designed to perform one or more specialized actions, such as, those described herein. Computer device 300 also includes a power supply 308, network interface 310, non-transitory processor-readable stationary storage device 312 for storing data and instructions, non-transitory processor-readable removable storage device 314 for storing data and instructions, input/output interface 316, GPS transceiver 318, display 320, keyboard 322, audio interface 324, pointing device interface 326, wireless interface 328, although a computer device 300 may include fewer or more components than those illustrated in FIG. 3 and described herein. Power supply 308 provides power to computer device 300.

Network interface 310 includes circuitry for coupling computer device 300 to one or more wired and/or wireless networks, and is constructed for use with one or more communication protocols and technologies including, but not limited to, protocols and technologies that implement various portions of the Open Systems Interconnection model (OSI model), global system for mobile communication (GSM), code division multiple access (CDMA), time division multiple access (TDMA), Long Term Evolution (LTE), 5G, 4G, 3G, 2G, user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or various ones of a variety of other wired and wireless communication protocols. Network interface 310 is sometimes known as a transceiver, transceiving device, or network interface card (MC). Computer device 300 may optionally communicate with a remote base station (not shown), or directly with another computer.

Audio interface 324 is arranged to produce and receive audio signals such as the sound of a human voice. For example, audio interface 324 may be coupled to a speaker and microphone (not shown) to enable telecommunication with others and/or generate an audio acknowledgement for some action. A microphone in audio interface 324 can also be used for input to or control of computer device 300, for example, using voice recognition.

Display 320 may be a liquid crystal display (LCD), gas plasma, electronic ink, light emitting diode (LED), Organic LED (OLED) or various other types of light reflective or light transmissive display that can be used with a computer. Display 320 may be a handheld projector or pico projector capable of projecting an image on a wall or other object.

Computer device 300 may also comprise input/output interface 316 for communicating with external devices or computers not shown in FIG. 3. Input/output interface 316 can utilize one or more wired or wireless communication technologies, such as USB™, Firewire™, Wi-Fi™, WiMax, Thunderbolt™, Infrared, Bluetooth™, Zigbee™, serial port, parallel port, and the like.

Also, input/output interface 316 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to computer device 300. Human interface components can be physically separate from computer device 300, allowing for remote input and/or output to computer device 300. For example, information routed as described here through human interface components such as display 320 or keyboard 322 can instead be routed through the network interface 310 to appropriate human interface components located elsewhere on the network. Human interface components include various components that allow the computer to take input from, or send output to, a human user of a computer. Accordingly, pointing devices such as mice, styluses, track balls, or the like, may communicate through pointing device interface 326 to receive user input.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 330 for controlling low-level operation of computer device 300. The memory also stores an operating system 332 for controlling the operation of computer device 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 334, which can be utilized by computer device 300 to store, among other things, applications 336 and/or other data. For example, data storage 334 may also be employed to store information that describes various capabilities of computer device 300. In one or more of the various embodiments, data storage 334 may store hologram function information 335 or beam shape information 337. The hologram function information 335 or beam shape information 337 may then be provided to another device or computer based on various ones of a variety of methods, including being sent as part of a header during a communication, sent upon request, or the like. Data storage 334 may also be employed to store social networking information including address books, buddy lists, aliases, user profile information, or the like. Data storage 334 may further include program code, data, algorithms, and the like, for use by one or more processors, such as processor 302 to execute and perform actions such as those actions described below. In one embodiment, at least some of data storage 334 might also be stored on another component of computer device 300, including, but not limited to, non-transitory media inside non-transitory processor-readable stationary storage device 312, processor-readable removable storage device 314, or various other computer-readable storage devices within computer device 300, or even external to computer device 300.

Applications 336 may include computer executable instructions which, if executed by computer device 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 336 may include hologram function engine 346, phase angle engine 347, cloud-based management engine 348, and/or analytics and control engine 349 that perform actions further described below. In one or more of the various embodiments, one or more of the applications may be implemented as modules and/or components of another application. Further, in one or more of the various embodiments, applications may be implemented as operating system extensions, modules, plugins, or the like.

Furthermore, in one or more of the various embodiments, specialized applications such as hologram function engine 346, phase angle engine 347, cloud-based management engine 348 and/or analytics and control engine 349, may be operative in a networked computing environment to perform specialized actions described herein. In one or more of the various embodiments, these applications, and others, may be executing within virtual machines and/or virtual servers that may be managed in a networked environment such as a local network, wide area network, or cloud-based based computing environment. In one or more of the various embodiments, in this context the applications may flow from one physical computer device within the cloud-based environment to another depending on performance and scaling considerations automatically managed by the cloud computing environment. Likewise, in one or more of the various embodiments, virtual machines and/or virtual servers dedicated to the hologram function engine 346, phase angle engine 347, cloud-based management engine 348, and/or analytics and control engine 349 may be provisioned and de-commissioned automatically.

Additionally, in one or more embodiments, remote analytics and control engine 349 may be employed by different types of users, e.g., customers, administrators, or technicians, to enable a webpage and/or an application to provide different types of security, controls, and/or information regarding an RF communication device. The information may include metrics, notifications, troubleshooting tips, software updates, strength of upload and download RF signal, alerts, restart controls, RF signal scanning controls, user permissions, metrics, or the like.

Also, in one or more of the various embodiments, the hologram function engine 346, phase angle engine 347, cloud-based management engine 348, analytics and control engine 349, or the like, may be located in virtual servers running in a networked computing environment rather than being tied to one or more specific physical computer devices.

Further, computer device 300 may comprise HSM 328 for providing additional tamper resistant safeguards for generating, storing and/or using security/cryptographic information such as, keys, digital certificates, passwords, passphrases, two-factor authentication information, or the like.

In some embodiments, hardware security module may be employed to support one or more standard public key infrastructures (PKI), and may be employed to generate, manage, and/or store keys pairs, or the like. In some embodiments, HSM 328 may be a stand-alone computer device, in other cases, HSM 328 may be arranged as a hardware card that may be installed in a computer device.

Additionally, in one or more embodiments (not shown in the figures), the computer device may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the computer device may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Client Computer

Figure 3B:
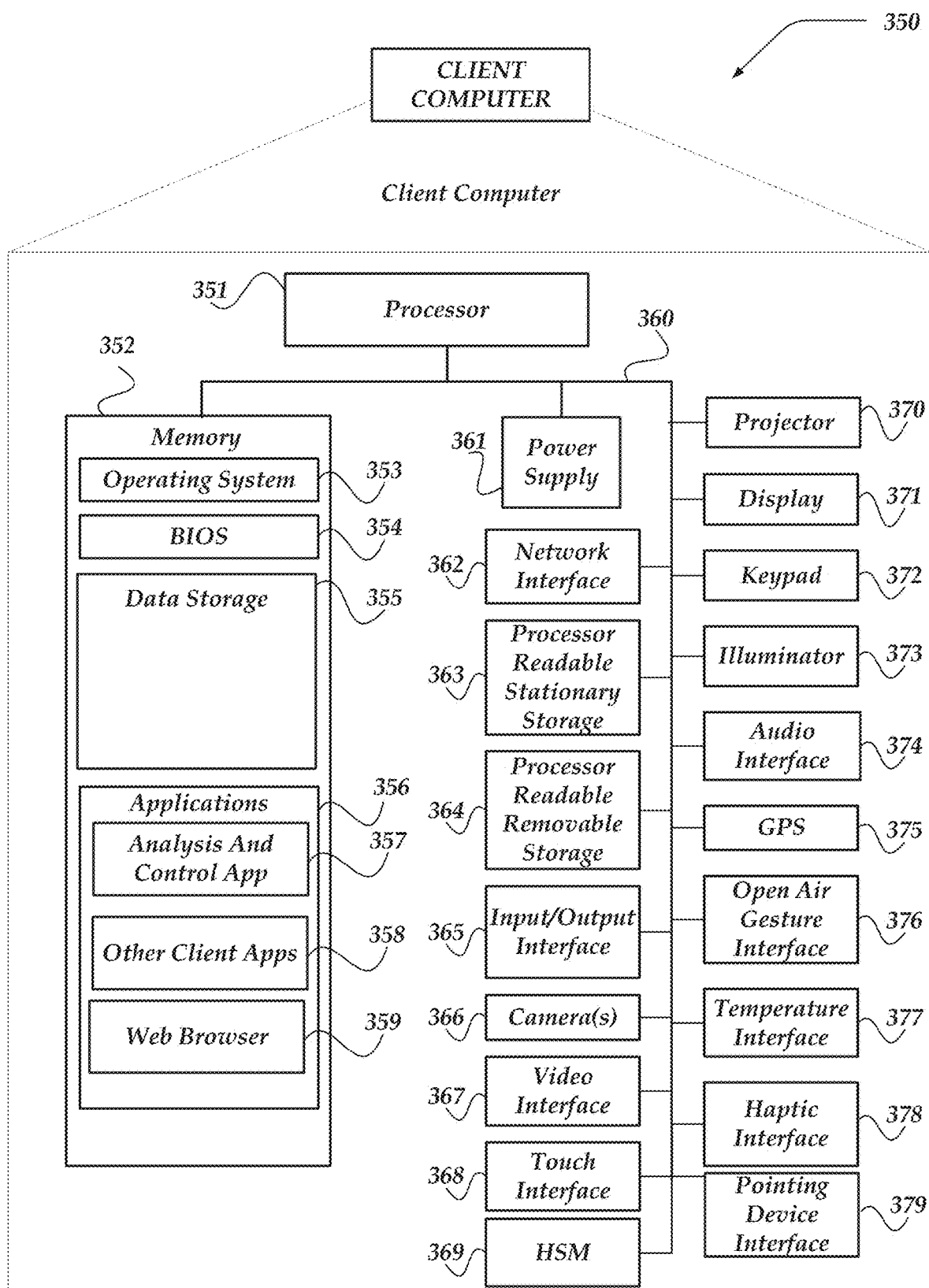
FIG. 3B illustrates an embodiment of an exemplary client computer device that may be included in a system such as that shown in FIG. 2A.

FIG. 3B shows one embodiment of client computer 350 that may include many more or less components than those shown. Client computer 350 may represent, for example, at least one embodiment of mobile computers or client computers shown in FIG. 2A.

Client computer 350 may include processor 351 in communication with memory 352 via bus 360. Client computer 350 may also include power supply 361, network interface 362, audio interface 374, display 371, keypad 372, illuminator 373, video interface 367, input/output interface 365, haptic interface 378, global positioning systems (GPS) receiver 375, open air gesture interface 376, temperature interface 377, camera(s) 367, projector 370, pointing device interface 379, processor-readable stationary storage device 363, and processor-readable removable storage device 364. Client computer 350 may optionally communicate with a base station (not shown), or directly with another computer.

Power supply 361 may provide power to client computer 350. A rechargeable or non-rechargeable battery may be used to provide power. The power may also be provided by an external power source, such as an AC adapter or a powered docking cradle that supplements or recharges the battery.

Network interface 362 includes circuitry for coupling client computer 350 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 362 is sometimes known as a transceiver, transceiving device, or network interface card (MC).

Audio interface 374 may be arranged to produce and receive audio signals such as the sound of a human voice. For example, audio interface 374 may be coupled to a speaker and microphone (not shown) to enable telecommunication with others or generate an audio acknowledgement for some action. A microphone in audio interface 374 can also be used for input to or control of client computer 350, e.g., using voice recognition, detecting touch based on sound, and the like.

Display 371 may be a liquid crystal display (LCD), gas plasma, electronic ink, light emitting diode (LED), Organic LED (OLED) or any other type of light reflective or light transmissive display that can be used with a computer. Display 371 may also include a touch interface 368 arranged to receive input from an object such as a stylus or a digit from a human hand, and may use resistive, capacitive, surface acoustic wave (SAW), infrared, radar, or other technologies to sense touch or gestures.

Projector 370 may be a remote handheld projector or an integrated projector that is capable of projecting an image on a remote wall or any other reflective object such as a remote screen.

Video interface 367 may be arranged to capture video images, such as a still photo, a video segment, an infrared video, or the like. For example, video interface 367 may be coupled to a digital video camera, a web-camera, or the like. Video interface 367 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 372 may comprise any input device arranged to receive input from a user. For example, keypad 372 may include a push button numeric dial, or a keyboard. Keypad 372 may also include command buttons that are associated with selecting and sending images.

Illuminator 373 may provide a status indication or provide light. Illuminator 373 may remain active for specific periods of time or in response to event messages. For example, when illuminator 373 is active, it may backlight the buttons on keypad 372 and stay on while the client computer is powered. Also, illuminator 373 may backlight these buttons in various patterns when particular actions are performed, such as dialing another client computer. Illuminator 373 may also enable light sources positioned within a transparent or translucent case of the client computer to illuminate in response to actions.

Further, client computer 350 may also comprise hardware security module (HSM) 369 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 369 may be a stand-alone computer, in other cases, HSM 369 may be arranged as a hardware card that may be added to a client computer.

Client computer 350 may also comprise input/output interface 365 for communicating with external peripheral devices or other computers such as other client computers and network computers. The peripheral devices may include an audio headset, virtual reality headsets, display screen glasses, remote speaker system, remote speaker and microphone system, and the like. Input/output interface 365 can utilize one or more technologies, such as Universal Serial Bus (USB), Infrared, WiFi, WiMax, Bluetooth™, and the like.

Input/output interface 365 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 350.

Haptic interface 378 may be arranged to provide tactile feedback to a user of the client computer. For example, the haptic interface 378 may be employed to vibrate client computer 350 in a particular way when another user of a computer is calling. Temperature interface 377 may be used to provide a temperature measurement input or a temperature changing output to a user of client computer 350. Open air gesture interface 376 may sense physical gestures of a user of client computer 350, for example, by using single or stereo video cameras, radar, a gyroscopic sensor inside a computer held or worn by the user, or the like. One or more cameras 366 may be used by an application to employ facial recognition methods to identify a user, track the user's physical eye movements, or take pictures (images) or videos.

GPS device 375 can determine the physical coordinates of client computer 350 on the surface of the Earth, which typically outputs a location as latitude and longitude values. GPS device 375 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 350 on the surface of the Earth. It is understood that GPS device 375 can employ a gyroscope to determine an orientation and/or an accelerometer to determine movement of the client computer 350. In one or more embodiment, however, client computer 350 may, through other components, provide other information that may be employed to determine a physical location of the client computer, including for example, a Media Access Control (MAC) address, IP address, and the like.

Human interface components can be peripheral devices that are physically separate from client computer 350, allowing for remote input or output to client computer 350. For example, information routed as described here through human interface components such as display 371 or keypad 372 can instead be routed through network interface 362 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

Figure 3C:
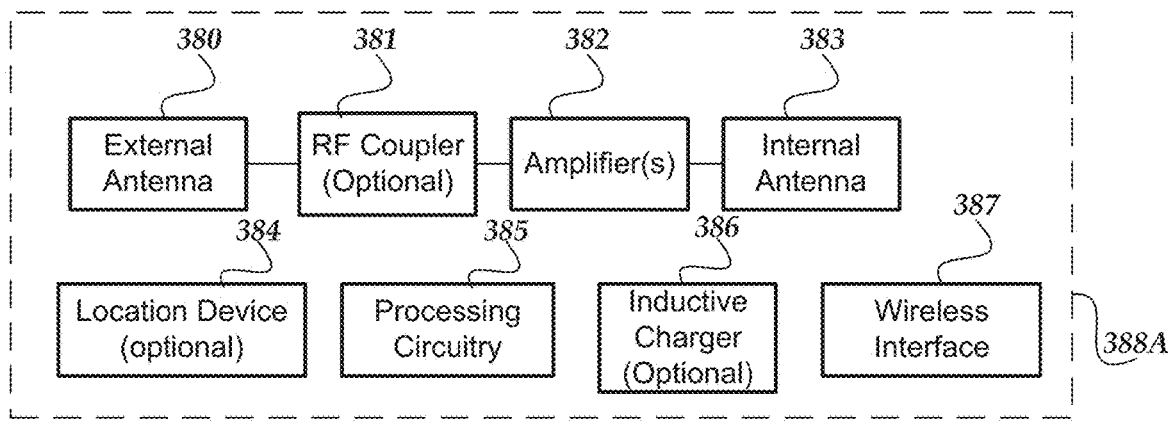
FIG. 3C shows an embodiment of an exemplary schematic for an RF communication device that is separate from a customer premises equipment device(s)
Figure 3D:
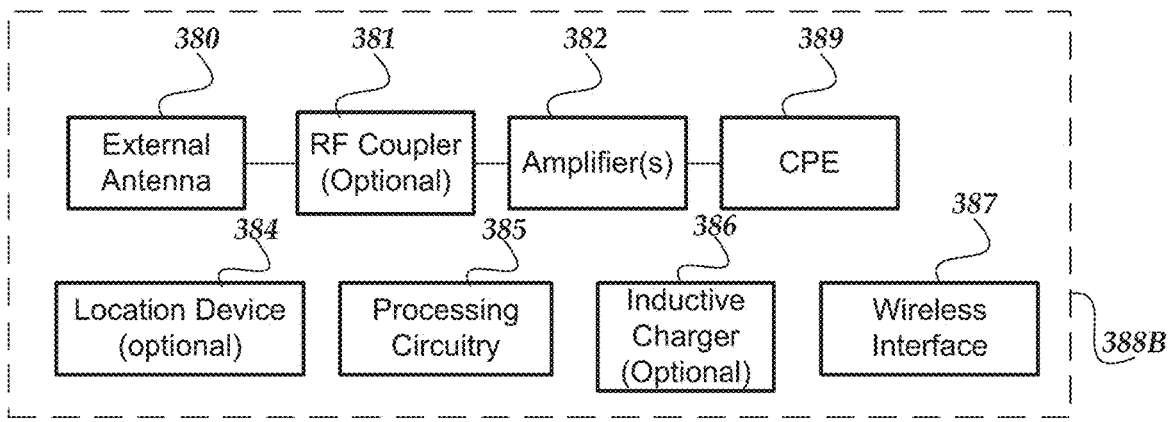
FIG. 3D illustrates an embodiment of an exemplary schematic for an Rf communication device that includes a customer premises equipment device(s)

Client computer 350 may include analysis and control app 357 that may be configured to remotely provide key performance indicators (KPIs) of the performance of an RF communication device such as shown in FIGS. 3C and 3D. The KPIs may include upload bandwidth, download bandwidth, strength of wireless signals communicated with a remote wireless base station, reflector, base station proxy, or customer premises equipment. Also, app 357 may authorize and enable different types of users (e.g., technicians, customers, and the like) to use a displayed interface to quickly identify and troubleshoot technical problems, assist in orientation of the RF communication device to provide an optimal wireless communication link with a remote wireless base station, and the like. The app may also enable adjustment of particular performance parameters to improve one or more aspects of the operation of the RF communication device. In one or more embodiments, app 357 may employ Bluetooth, wifi, or any other wireless or wired communication link to communicate with the RF communication device.

Client computer 350 may include web browser application 359 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 352 may include RAM, ROM, or other types of memory. Memory 352 illustrates an example of computer-readable storage media (devices) for storage of information such as computer-readable instructions, data structures, program modules or other data. Memory 352 may store BIOS 354 for controlling low-level operation of client computer 350. The memory may also store operating system 353 for controlling the operation of client computer 350. It will be appreciated that this component may include a general-purpose operating system such as a version of UNIX, or LINUX™, or a specialized client computer communication operating system such as Windows Phone™, Apple iOS™ or the Symbian® operating system. The operating system may include, or interface with a Java virtual machine module that enables control of hardware components or operating system operations via Java application programs.

Memory 352 may further include one or more data storage 355, which can be utilized by client computer 350 to store, among other things, applications 356 or other data. For example, data storage 355 may also be employed to store information that describes various capabilities of client computer 350. The information may then be provided to another device or computer based on any of a variety of methods, including being sent as part of a header during a communication, sent upon request, or the like. Data storage 355 may also be employed to store social networking information including address books, buddy lists, aliases, user profile information, or the like. Data storage 355 may further include program code, data, algorithms, and the like, for use by a processor, such as processor 351 to execute and perform actions. In one embodiment, at least some of data storage 355 might also be stored on another component of client computer 350, including, but not limited to, non-transitory processor-readable removable storage device 364, processor-readable stationary storage device 363, or even external to the client computer.

Applications 356 may include computer executable instructions which, when executed by client computer 350, transmit, receive, or otherwise process instructions and data. Applications 356 may include, for example, analysis and control app 357, other client applications 358, web browser 359, or the like. Client computers may be arranged to exchange communications, such as, queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 350 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Exemplary Schematics

FIG. 3C shows an embodiment of an exemplary schematic for RF communication device 388A that is separate from a CPE device (not shown). As discussed above, the RF communication device 388A may be configured with all of its major components located on an outside surface of a barrier, all of the components located on an inside surface of the barrier, and a portion of the RF communication device's components that include external antenna 380 located on the barrier's outside surface and another portion of these components that include internal antenna 383 located on the barrier's inside surface.

In one or more embodiments, external antenna 380 employs a scanning array antenna, such as an HMA, to communicate upload and download RF signals with a remotely located wireless base station (not shown). When RF communication device 388A is configured to be located on the inside surface of a barrier, such as a glass window, external antenna 380 is positioned to communicate the upload and download RF signals through the glass barrier to the remote wireless base station.

In one or more exemplary embodiments, external antenna 380 may adjust an HMA waveform employed by the HMA to compensate a decrease in gain caused by the scan impedance of the glass window during communication through the glass window of the upload and download RF signals with the remote wireless base station. The scan impedance may be caused by one or more factors, including thickness of glass, index of refraction of the glass, layers of the glass, coatings on the glass, or the like. In one or more embodiments, the scan impedance compensation includes detecting a direction of the HMA waveform to provide the strongest RF signal communication with the remote wireless base station, and then employing the HMA to adjust the scan impedance of the wave front of the radiated RF signal. In one or more embodiments, the bias voltage to one or more varactors that control scattering elements of the HMA may be adjusted to increase the gain of the communicated RF signals.

In one or more embodiments, internal antenna 383 may be configured as an array of patch antennas to communicate the upload and download RF signals towards the CPE. However, in one or more embodiments, internal antenna 383 may be configured with an HMA instead of the patch antenna array to communicate the upload and download RF signals to a remotely located CPE across relatively long distances such as found in stadiums, factories, assembly buildings, concert halls, or the like. Also, one or more of relay devices, or reflector devices may be employed to further extend a distance that the upload and download RF signals can be communicated inside a large structure to reach a remotely located CPE. Additionally, in one or more embodiments, the CPE may include a beam forming antenna, e.g., an HMA, to communicate upload and download RF communication signals with the RF communication device.

Wireless interface 387 may be employed to perform various functions with one or more different types of one or more different wireless communication protocols, such as Bluetooth, Bluetooth LE, Zigbee, WiFi, LTE, CDMA, GSM, TDMA, or the like. Further, in one or more embodiments, a webpage and/or an application may employ wireless interface 387 to provide different types of security, controls, and/or information regarding the RF communication device 388A. The information may include metrics, notifications, troubleshooting tips, software updates, strength of upload and download RF signal, alerts, restart controls, RF signal scanning controls, user permissions, metrics, or the like. In one or more embodiments, wireless interface 387 may be employed to establish an inband wireless communication channel between the CPE and RF communication device 388A. In another embodiment, wireless interface 387 may be employed to establish an out of band wireless communication channel between a technician and RF communication device 388A. Also, in yet another embodiment, wireless interface 387 may be employed to establish an out of band wireless communication with one or more applications, e.g., an analytics and control engine, located at network operations centers, data centers, wireless base stations, or the like.

In one or more embodiments, RF coupler 381 may optionally be included to communicate the upload and download RF signals through a barrier, such as a glass window, when RF communication device 388A is physically located on an outside surface of the barrier or one portion of the RF communication device's components are located on the outside surface and another portion of the RF communication device's components are located on the inside surface of the barrier. However, in one or more embodiments when RF communication device 388A is entirely located on an inside surface of a barrier, then RF coupler 381 may not be included with the RF communication device.

In one or more embodiments, location device 384 may optionally be included with RF communication device 388A. Location device 384 may include a gyroscope, accelerometer, GPS device, and the like to detect an orientation, movement, and/or location of RF communication device 388A. In one or more embodiments, location device 384 may be employed by a technician to orient an installation of RF communication device 388A in such a way as to optimize communication of upload and download RF signals with a remotely located wireless base station.

In one or more embodiments, inductive charger 386 may be optionally included to provide electrical power when RF communication device 388A is physically located on an outside surface of the barrier or one portion of the RF communication device's components are located on the outside surface and another portion of the RF communication device's components are located on the inside surface of the barrier. Although not shown, in one or more embodiments, one or more solar panels may be employed to provide electrical power to RF communication device 388A. Further, in one or more embodiments, when RF communication device 388A is entirely positioned on an inside surface of a barrier, electrical power may be provided directly by an electrical outlet located inside a structure.

In one or more embodiments, processing components 385 are employed to control and/or manage operation of RF communication device 388A and one or all of the components included with the RF communication device. In one or more embodiments, processing circuitry 385 includes one or more of a processor, memory, application specific integrated circuit (ASIC), Field Programmable Gate Array (FPGA), or the like.

Also, in one or more embodiments, amplifier 382 may include a bi-static amplifier that simultaneously provides continuous and separate gains to upload RF wireless signals and download RF wireless signals. The bi-static amplifier is configured to employ separate upload and download amplifiers to separately provide a gain to the upload RF wireless signal as it is radiated by the exterior antenna and another gain to the download RF wireless signal as it is radiated by the interior antenna to the CPE. Also, in yet other embodiments, the bi-directional amplifier provides separate gains to the upload and download RF wireless signals by isolating and timing the communication of these upload and download RF wireless signals.

FIG. 3D illustrates an embodiment of an exemplary schematic for RF communication device 388B that includes CPE 389. Although not shown, amplifier 382 may be configured to provide gain for the upload RF wireless signal and not provide gain to the download RF wireless signal because CPE 389 may be configured to receive the download RF signal directly from external antenna 380. Also, an internal antenna would not be included as a component of RF communication device 388B. Additionally, external antenna 380, RF coupler 381, location device 384, processing circuitry 385, inductive charger 386 and wireless interface 387 are configured substantially the same as discussed above for RF communication device 388A and as shown in FIG. 3C.

Figure 3E:
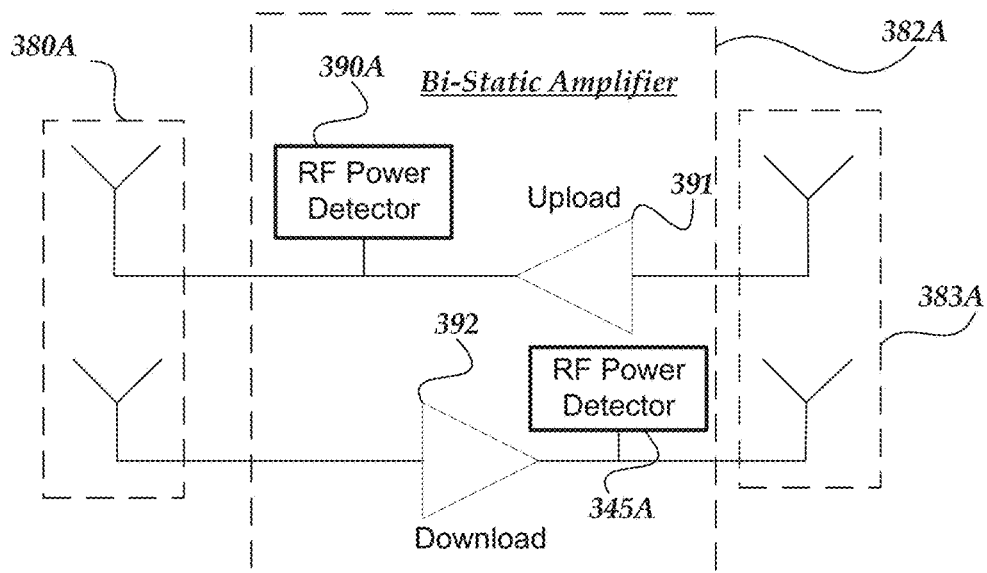
FIG. 3E shows an embodiment of an exemplary schematic for a bistatic amplifier that is employed by an RF communication device.

FIG. 3E shows an embodiment of an exemplary schematic for bistatic amplifier 382A that is employed by an RF communication device. External antenna 380A is arranged to simultaneously communicate upload and download RF wireless signals with a remotely located wireless base station (not shown). Also, internal antenna 383A is arranged to simultaneously communicate upload and download RF wireless signals with a CPE (not shown). Upload amplifier 391A is arranged to provide gain for the upload RF wireless signal and download amplifier 392A is arranged to provide gain for the download RF wireless signal. Additionally, RF power detector 390A is arranged to monitor a value of the power of the upload RF wireless signal. Also, RF power detector 345A is arranged to monitor a value of the power of the download RF wireless signal.

FIG. 3F illustrates an embodiment of a configuration of external antenna 392 formed from an HMA that provides separate vertical and horizontal polarization for both uplink and downlink RF signals.

FIG. 3G shows an embodiment of a configuration of external antenna 393 formed from an HMA that provides combined vertical and horizontal polarization for both uplink and downlink RF signals.

FIG. 3H illustrates an embodiment of a configuration of external antenna 394 formed from patch antennas that provide combined vertical and horizontal polarization and combined uplink and downlink communication for RF signals.

Figure 3I:
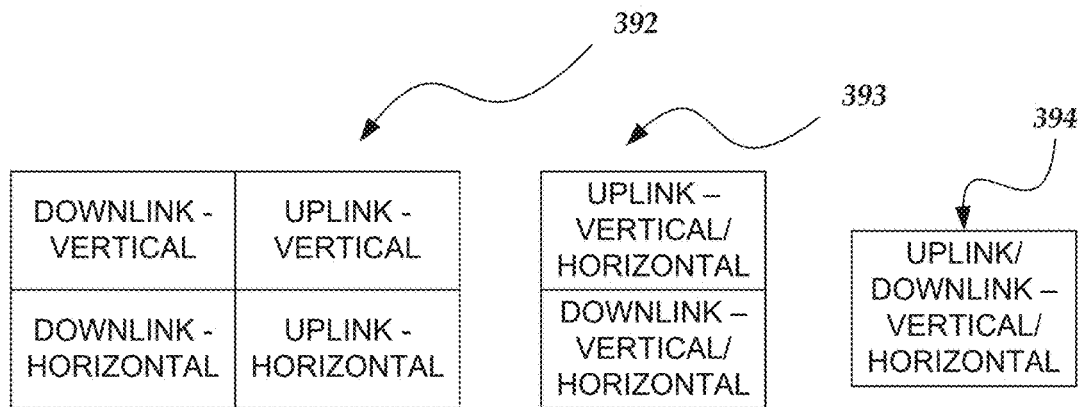
FIG. 3I shows an embodiment of RF isolation spacer that may isolate and reduce coupling between the upload and download RF wireless signals communicated by one or more patch antennas positioned in ports through a barrier such as glass.
Figure 3I:
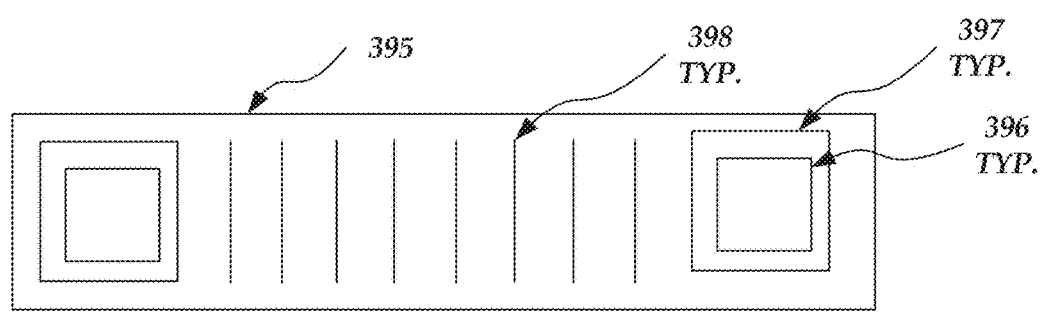

FIG. 3I shows an embodiment of RF isolation spacer 395 for isolating and reducing coupling between the upload and download RF wireless signals communicated by patch antennas 396 (positioned in ports 397) through a barrier such as glass. Also, a plurality of slits 398 are provided in spacer 395 to further reduce coupling. In one or more embodiments, spacer 395 is employed with an RF coupler (patch antennas used to separately and continuous communicate upload and download RF signals through the barrier) when the external antenna is located on an exterior surface of a barrier and the internal antenna is located on an interior surface of the barrier.

Figure 3J:
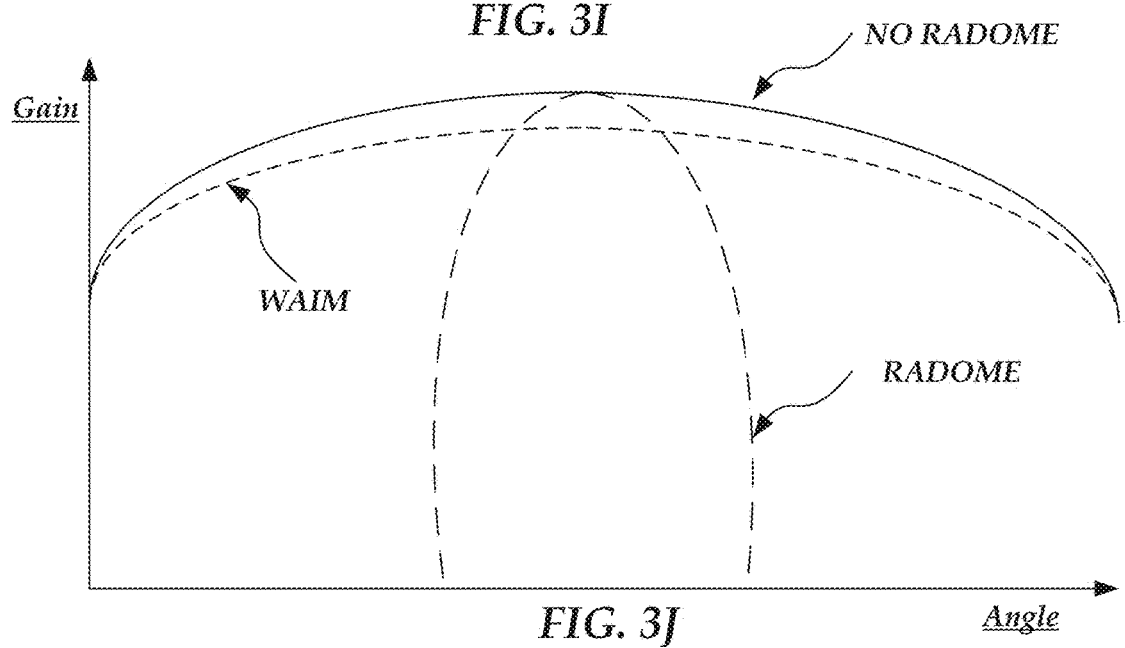
FIG. 3J illustrates a representation of a gain versus angle relationship for the external antenna when using a radome, a radome with WAIM, and no radome.

FIG. 3J illustrates a representation of a gain versus angle relationship for an external antenna when using a radome, a radome with WAIM, and no radome.

Figure 3K:
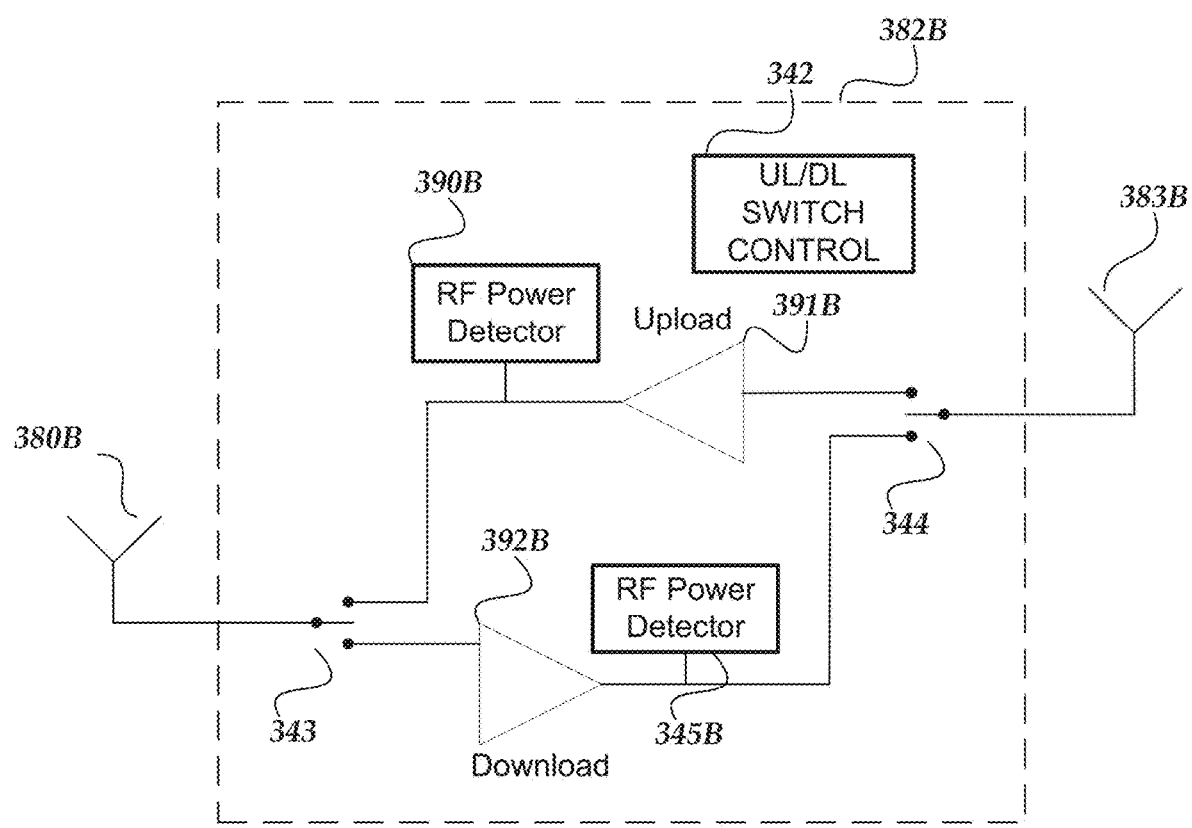
FIG. 3K shows an embodiment of an exemplary schematic for a bidirectional amplifier that is employed by an RF communication device.

FIG. 3K shows an embodiment of an exemplary schematic for bi-directional amplifier 382B that is employed by an RF communication device. External antenna 380B is arranged to communicate upload RF wireless signals and download RF wireless signals with a remotely located wireless base station (not shown). Also, internal antenna 383B is arranged to communicate download RF wireless signals and upload RF wireless signals with a CPE (not shown). Upload amplifier 391B is arranged to provide gain for the upload RF wireless signal and download amplifier 392B is arranged to provide gain for the download RF wireless signal. Additionally, RF power detector 390B is arranged to monitor a value of the power of the upload RF wireless signal. Also, RF power detector 345B is arranged to monitor another value of the power of the download RF wireless signal.

Moreover, upload/download switch control 342 is employed to control a timing of external facing three-way switch 343 and internal facing three-way switch 344. In one or more embodiments, control 342 provides for timing a continuous switching of switches 343 and 344 between two different conductive states to share external antenna 380B and internal antenna 383B on a common communication path used by both the upload and download RF wireless signals. In one or more embodiments, the timing of the continuous switching of switch 343 and switch 344 may be staggered to provide isolation of the upload and download RF wireless signals from each other while sharing the external antenna 380B and internal antenna 383B on the common communication path. Furthermore, in one or more embodiments, both external antenna 380B and internal antenna 383B may include fewer components at least because they are shared in the communication of both the upload and download RF wireless signals.

Additionally, in one or more embodiments of the RF communication device, RF absorbent material may be added to on top of RF components to decrease RF feedback so that separate gains provided for the upload and download RF wireless signals communicated through a barrier may be optimized.

Furthermore, in one or more embodiments of the RF communication device, the HMA may be characterized when optimizing gain to reduce close coupling to adjacent RF components. Also, in one or more embodiments, a gain for the uplink RF wireless signal may be maximized due to a relatively long distance from the remotely located wireless base station. In contrast, the RF communication device may be employed to determine a distance away from the CPE and use that distance to reduce a gain of the download RF wireless signal communicated by the RF communication device to the CPE.

In one or more embodiments, the external antenna may employ the HMA to provide composite HMA waveforms to compensate for objects affecting communication of the upload and download RF wireless signals with the remote wireless base stations. Also, in one or more embodiments, the composite HMA waveforms may be employed to multicast communication of the upload and download RF wireless signals with two or more remote wireless base stations.

In one or more embodiments, automatic gain control (AGC) circuitry is provided to automatically adjust the separate gains provided for the upload RF wireless signal and the download RF wireless signal until separately selectable gains are determined that provide for optimal communication between the CPE and the RF communication device and between the remote wireless base station and the RF communication device.

Generalized Operations

Figure 4A:
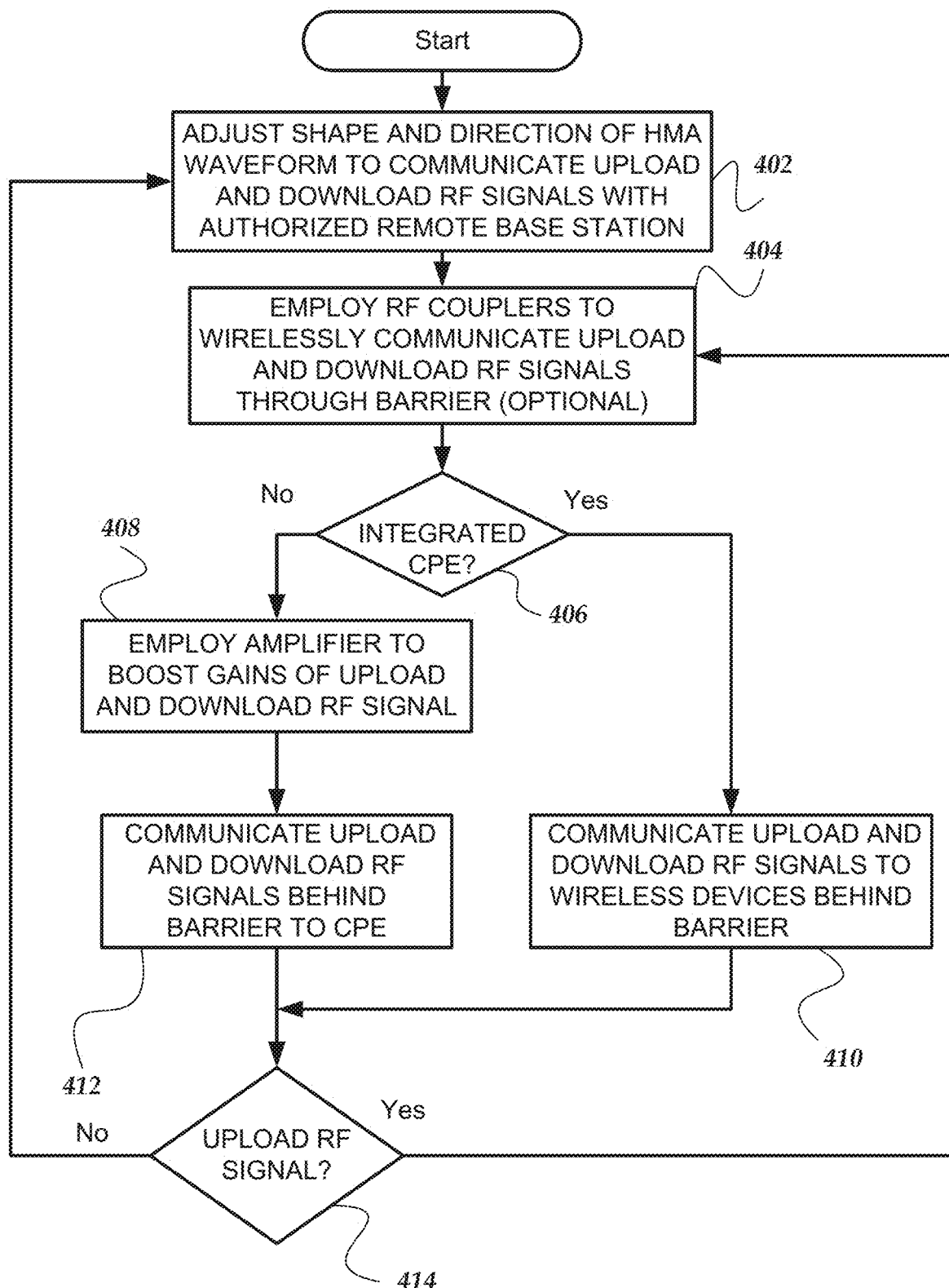
FIG. 4A illustrates an embodiment of a logical flow diagram for an exemplary method of employing HMAs to communicate 5G wireless signals through a window of a structure and broadcast those 5G wireless signals to one or more wireless computing devices inside the structure.

In FIG. 4A, a method is shown for employing the invention to communicate wireless signals through a barrier, such as a window in a structure, to one or more wireless computing devices and/or wired computing devices behind the barrier. Moving from a start block, the process advances to block 402 where the RF communication device employs an external antenna, that includes an HMA, to adjust a shape and a direction of a beam pattern of the HMA waveform to communicate upload and download RF wireless signals with one or more authorized remote base stations. In one or more embodiments, adjustment of the HMA waveform may be controlled out of band by a separate wireless communication channel which may employ 4G or less wireless communication protocols. At block 404, optional RF couplers are disposed on opposite exterior and interior sides of a barrier when an external antenna and an internal antenna are also similarly positioned. The RF couplers are employed to communicate (upload and download) RF wireless signals through the barrier. However, in one or more embodiments when all of the substantive components of the RF communication device are disposed on an exterior surface or an interior surface of a barrier instead of on both the interior and exterior surfaces, then the logic at block 404 for RF couplers would not be applied.

At decision block 406, a determination is made as to whether the CPE is integrated with the RF communication device. If the determination is no, then the process flows to block 408 where one or more amplifiers are employed to separately provide gain to the upload and download RF wireless signals that are communicated through the window barrier. Moving to block 412, the upload and download RF wireless signals are communicated with one or more CPEs, which may further communicate with one or more wireless devices and/or wired devices located behind the barrier and/or inside a structure.

At decision block 414, if a value of the power of the upload RF wireless signal is below a predetermined threshold and another value of the power of the download RF wireless signal indicates a presence of communication with a remote wireless base station, the process loops back to block 402 where the process resumes substantially the same actions. Alternatively, if the value of the power of the upload RF wireless signal is not less than the predetermined threshold and the other value of the power of the download RF wireless signal indicates the presence of communication with the remote wireless base station, the process loops back to block 404 and resumes substantially the same actions.

Alternatively, if the determination at decision block 406 is yes (one or more CPEs are integrated with the RF communication device), then the upload and download RF wireless signals are communicated by the one or more CPEs via one or more communication protocols to one or more of the wireless devices and/or wired devices disposed inside the structure. Next, the process advances to decision block 414 and resumes substantially the same actions.

Figure 4B:
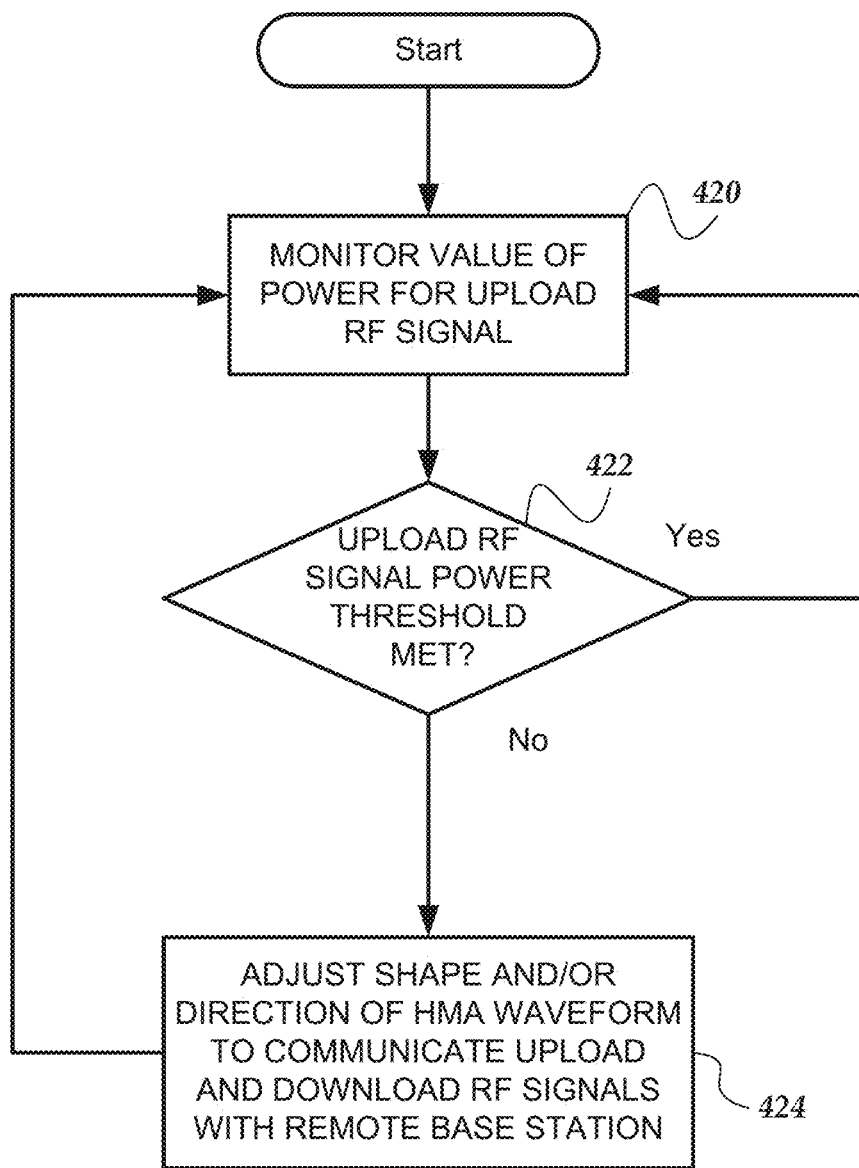
FIG. 4B shows an embodiment of a logic flow diagram for an exemplary method of employing a value of the power of an upload RF signal to detect when a CPE is communicating remotely with a wireless base station that is authorized for communication with the CPE.

In FIG. 4B, a method is shown for employing the invention to automatically determine when an authorized remote wireless base station is in communication with the CPE. Because a value of the power of the upload RF wireless signals communicated by the RF communication device are significantly greater when the CPE is in communication with a remote base station that is authorized for communication with the CPE and another value of the power of the download RF wireless signals indicates the presence of communication with the remote wireless base station. Thus, when bistatic amplification is used for the upload and download RF wireless signals, this power value of the upload RF wireless signal may be employed to detect authorized communication without having to further analyze other characteristics or content of the upload RF wireless signal. Moving from a start block to block 420, the process monitors a value of the power for the upload RF wireless signal while a bistatic amplifier simultaneously provides separately selectable gain to the upload and download RF wireless signals. At decision block 422, a determination is made as to whether the power value of the upload RF wireless signal exceeds a predetermined threshold. If true, the process loops back to block 420. However, if the determination is false, then the process steps to block 424 where a shape and/or direction of an HMA waveform provided by the external antenna's HMA is adjusted to communicate download and upload RF wireless signals with another remote wireless base station. Also, in one or more embodiments, control of the adjustment to the shape and/or direction of the HMA waveform is controlled remotely through an out of band communication channel employing a 4G or less wireless communication protocol. Next, the process loops back to block 420, and performs substantially the same actions.

Relay Based Network Architecture

Figure 5:
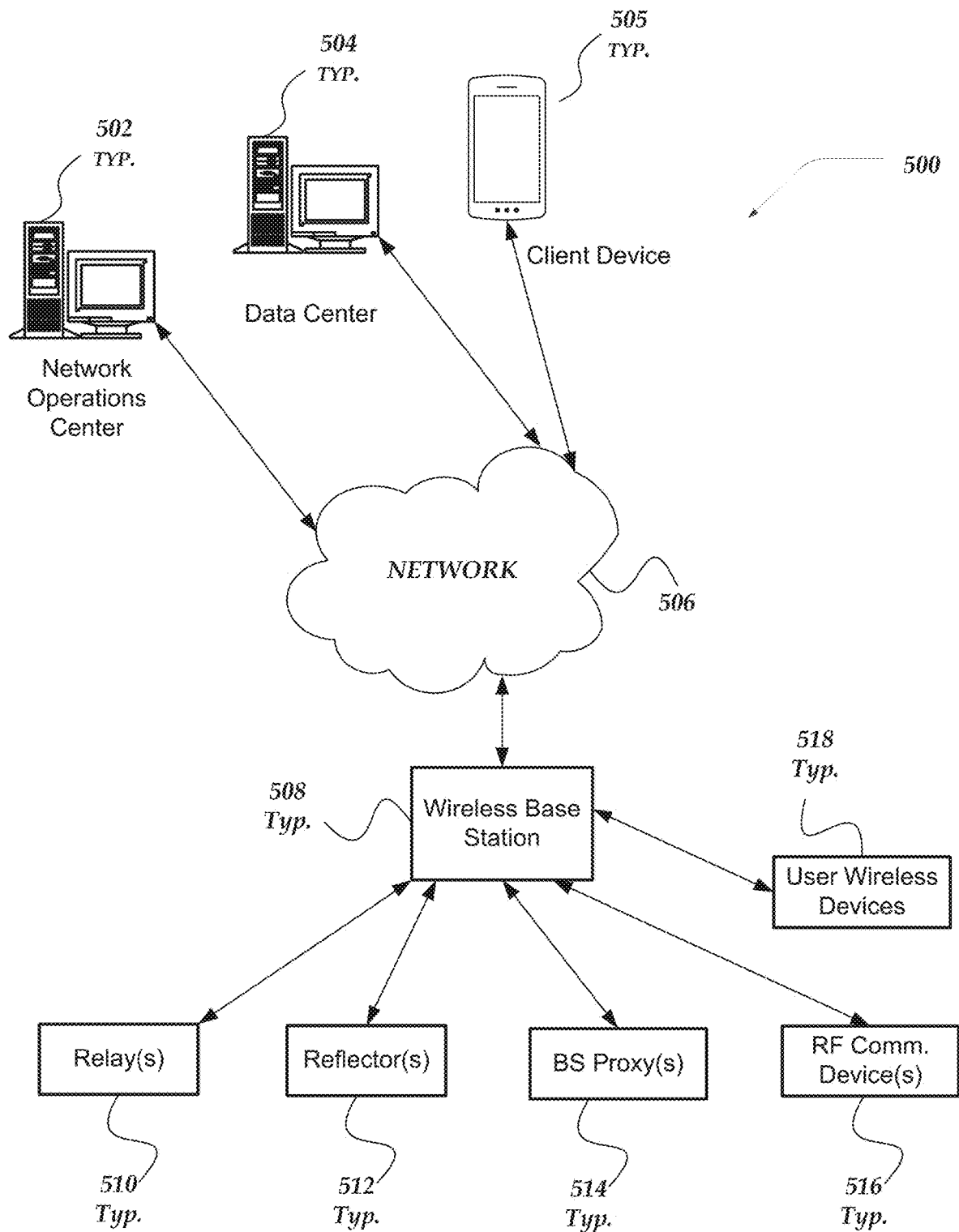
FIG. 5 shows a top view of an embodiment of an exemplary environment, including an arrangement of a network operations center and a wireless signal base station in communication with relay HMA devices, reflector HMA devices, base station proxy HMA devices, and user HMA devices.

In one or more embodiments, a physical distance that a base station provides 5G wireless communication to wireless communication devices employed by users is extended by the use of communication HMA devices that are similar to RF communication devices that employ HMAs for their external antennas, but somewhat differently. FIG. 5 illustrates an exemplary embodiment that extends the physical distance that upload and download RF signals can be communicated between a remote base station and an RF communication device by employing in between different configurations of communication HMA devices. The RF communication device typically includes an external facing antenna that includes at least one HMA which employs HMA waveforms to communicate by line of sight with a remote base station. In contrast, a communication HMA device includes two or more HMAs and a corresponding controller that in addition to configuring HMA waveforms, it also is employed to configure different communication modes of operation, including a relay HMA device, a reflector HMA device, or a base station proxy HMA device.

In one or more embodiments, the communication HMA devices may typically consume less than 50 watts of power, and these devices are able to reliably communicate HMA waveforms one kilometer or more between the next HMA antenna. Also, the configuration of two or more HMAs can be arranged at different angles to each other, e.g., perpendicular, so that communication of an HMA waveform can "bend" around a corner of a structure and/or avoid an occlusion to line of sight communication with other communication HMA devices and/or user HMA devices.

In one or more embodiments, a communication HMA device may be configured to operate as a reflector HMA device that employs one HMA to communicate with one or more RF communication devices positioned at relatively static physical locations. The reflector HMA device employs another HMA to communicate with one or more base stations, base station proxy HMA devices, or relay HMA devices. In the reflector mode of operation, the HMA waveform received by the one or more user HMA devices is employed to provide 5G wireless communication to users.

As shown in FIG. 5, illustrates an overview of system 500 for communicating data from one or more data centers 504 which employs one or more network operations centers 502 to route the data to one or more remote wireless base stations 508 that communicate the data in the form of RF wireless signals to one or more wireless communication devices (not shown). As shown, the data is communicated from one or more data centers 504 and routed in part by one or more NOCs 502 over network 506 to one or more remote wireless base stations 508 that wirelessly communicate the data with one or more RF communication devices 516, one or more user wireless devices 518, and one or HMA communication devices configured as one or more of relay devices 410, reflectors 512, and/or base station proxies 514. Also, one or more client devices 505 may execute an app that provides remote analysis and control of the one or more RF communication devices and/or different configurations of one or more communication HMA devices.

Figure 6A:
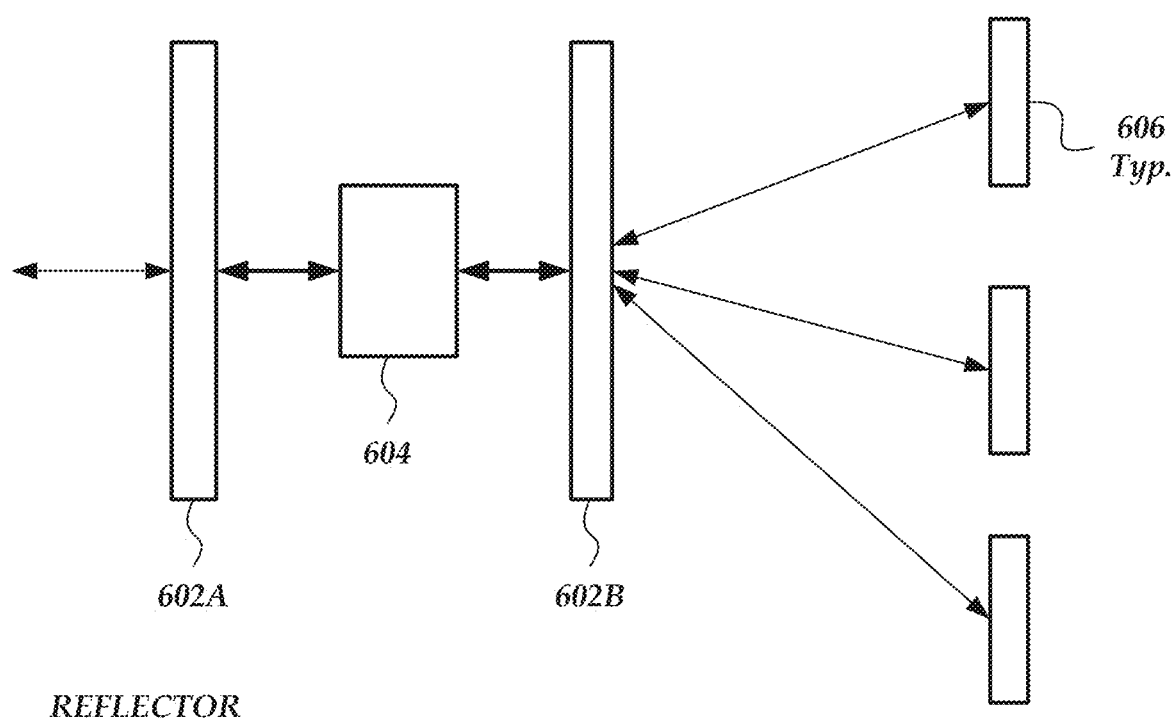
FIG. 6A illustrates a reflector HMA device that employs a first HMA to communicate by HMA waveforms with one or more of relay HMA devices, base station HMA devices, or base station proxy HMA devices and a second HMA arranged to communicate by HMA waveforms with one or more user HMA devices.
Figure 6B:
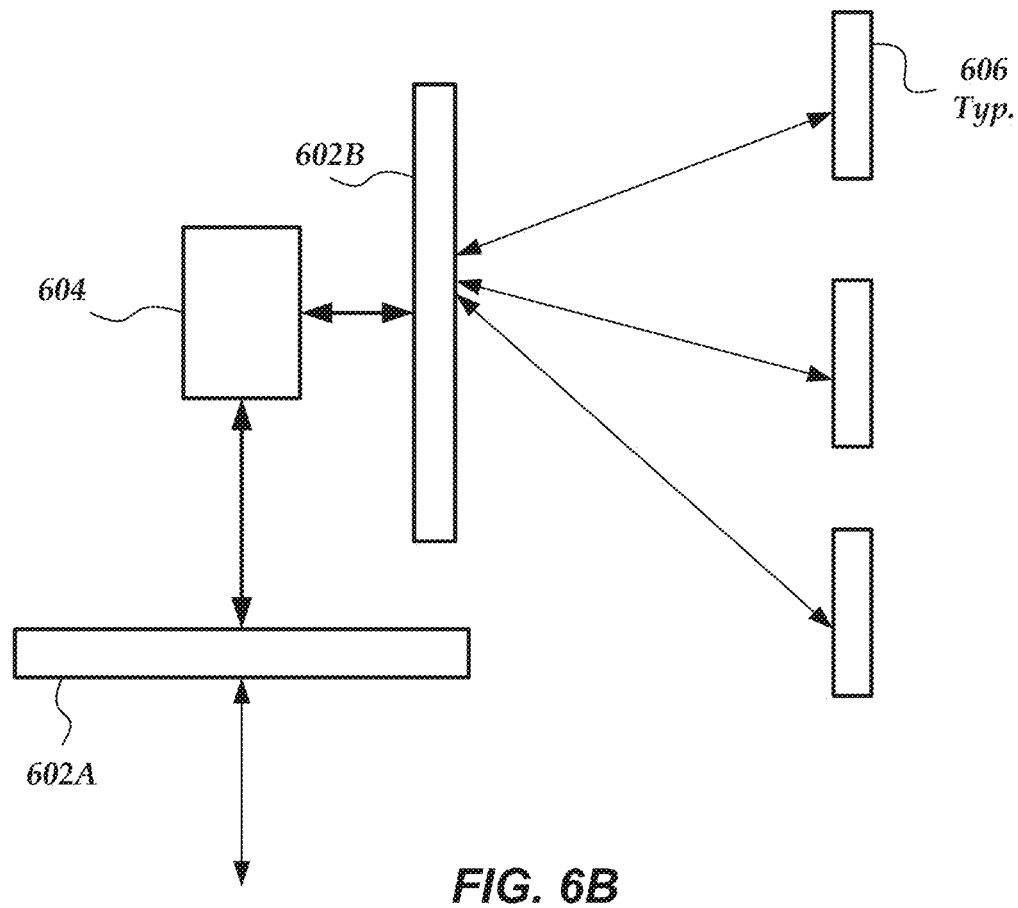
FIG. 6B illustrates a reflector HMA device that employs a first HMA to communicate by HMA waveforms with one or more relay HMA devices, base station HMA devices, or base station proxy HMA devices and a second HMA arranged perpendicular to the first HMA to avoid occlusion of one or more HMA waveform communicated to one or more user HMA devices.

Additionally, FIGS. 6A and 6B, show a communication HMA device configured as a reflector HMA device with controller 604 arranged to operate HMA 602A to communicate RF wireless signals via HMA waveforms to other communication HMA devices and HMA 602B to communication RF wireless signals via HMA waveforms with a plurality of RF communication devices 606.

In one or more embodiments, a communication HMA device may be configured to operate as a relay HMA device that employs one HMA to communicate RF signals with a base station, base station proxy HMA device, a reflector HMA device or another relay HMA device. And the relay HMA device employs another HMA to communicate RF signals with another relay HMA devices, or reflector HMA device. In the relay mode of operation, an HMA waveform of RF signals is generally "relayed" from one communication HMA device to another communication HMA device in the network fabric until the RF signals are communicated to its destination, i.e., one or more RF communication devices and/or one or more user wireless communication devices.

Figure 7A:
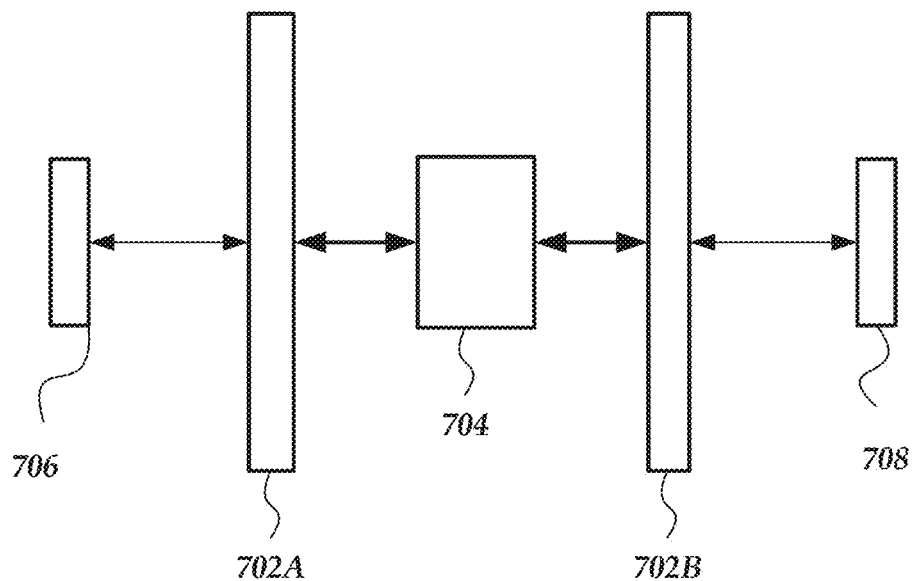
FIG. 7A illustrates a relay HMA device that employs a first HMA to communicate by HMA waveforms with one or more of other relay HMA devices, base station HMA devices, or base station proxy HMA devices and a second HMA to communicate by HMA waveforms with one or more other relay HMA devices, reflector HMA devices, or user HMA devices.
Figure 7B:
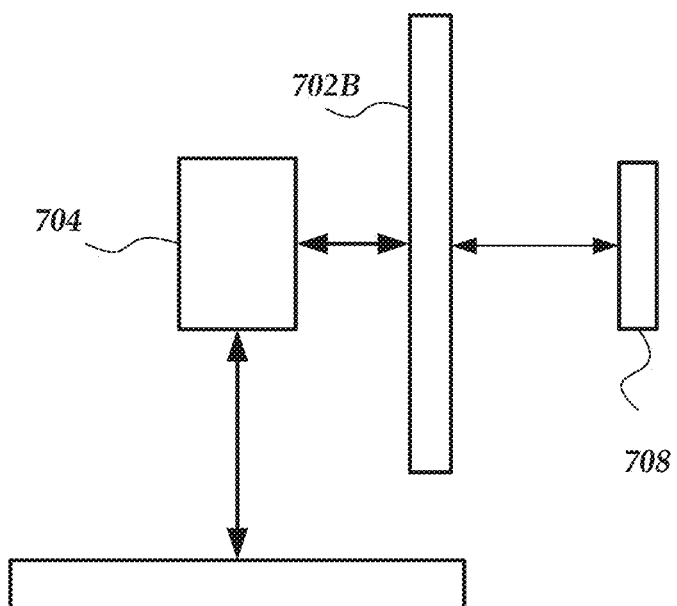
FIG. 7B illustrates a relay HMA device that employs a first HMA to communicate by HMA waveforms with one or more of other relay HMA devices, base station HMA devices, or base station proxy HMA devices and a second HMA arranged perpendicular to the first HMA to avoid occlusion of one or more HMA waveforms communicated to one or more other relay HMA devices, reflector HMA devices, or user HMA devices.

Additionally, FIGS. 7A and 7B, show a communication HMA device configured as a relay HMA device with controller 704 arranged to operate HMA 702A to communicate RF signals with HMA waveforms with another communication HMA device 706 and HMA 702B to communicate RF signals with HMA waveforms with yet another communication HMA device 708.

In one or more embodiments, a communication HMA device may be configured to operate as a base station proxy HMA device that employs one HMA to communicate with a base station, or another base station proxy HMA device. And the base station proxy HMA device employs another HMA to multiplex communication of HMA waveforms with one or more other communication HMA devices that may be configured as one or more of relay HMA devices or reflector HMA devices, RF communication devices, and/or user wireless communication devices.

Figure 8A:
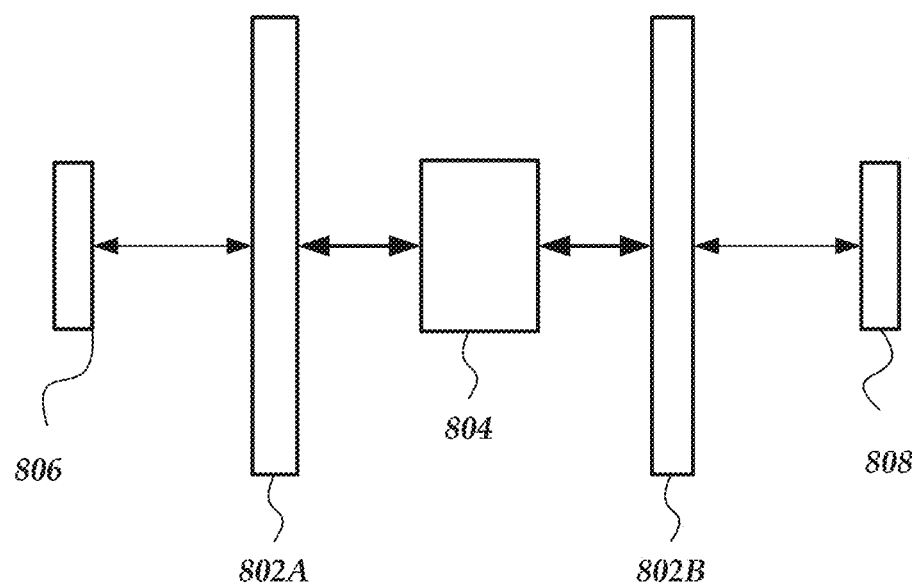
FIG. 8A illustrates a base station proxy HMA device that employs a first HMA to communicate by HMA waveforms with one or more of other relay HMA devices, base station HMA devices, or base station proxy HMA devices; and a second HMA to communicate by HMA waveforms with one or more other relay HMA devices, reflector HMA devices, or user HMA devices.
Figure 8B:
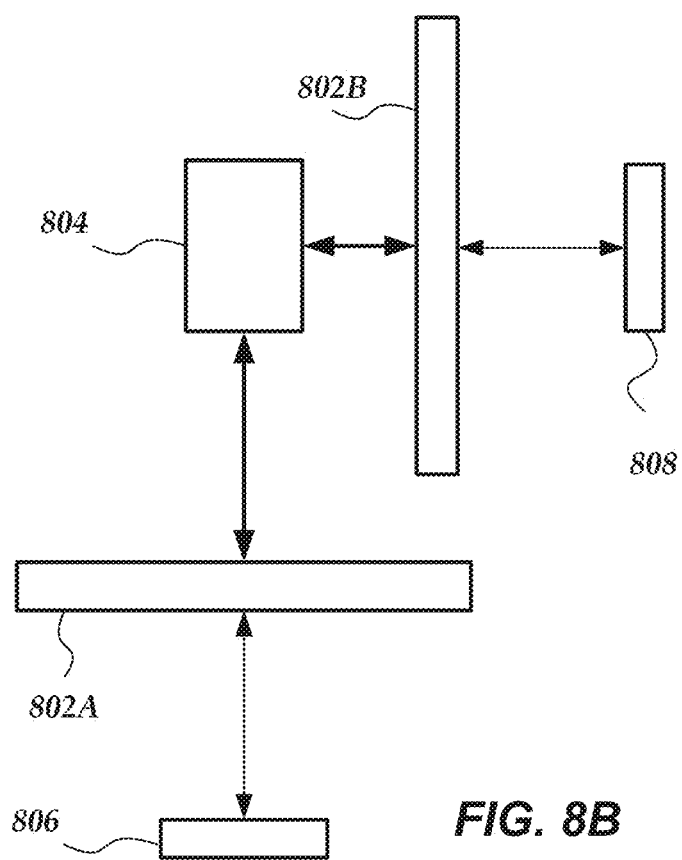
FIG. 8B illustrates a base station proxy device that employs a first HMA to communicate with a relay device, a base station, or a base station proxy device and a second HMA arranged perpendicular to the first HMA to avoid occlusion of one or more HMA waveforms communicated to one or more other relay HMA devices, reflector HMA devices, or user HMA devices.

Additionally, FIGS. 8A and 8B, show a communication HMA device configured as a base station proxy HMA device with controller 804 that is arranged to operate HMA 802A to communicate RF signals with HMA waveforms with a base station or another base station proxy HMA device 806 and HMA 802B to multiplex communication of the RF signal HMA waveforms with other communication HMA devices 808 e.g., reflector HMA devices, relay HMA devices, RF communication devices, and/or user wireless communication devices.

In one or more embodiments, a plurality of communication HMA devices are physically located on telephone poles, light poles, towers, structures, and the like, throughout a city, town, factory, industrial area, park, or the like. In one or more embodiments, a network fabric is formed by the plurality of communication HMA devices arranged in a physical area, which can be dynamically controlled. The network fabric configuration provides for dynamic real time load balancing, redundancy, and reconfiguration of communication modes of the HMA communication devices to provide reliable and economical 5G wireless communication for users of wireless communication devices, such as mobile phones, tablets, notebooks, vehicles or the like.

Figure 9:
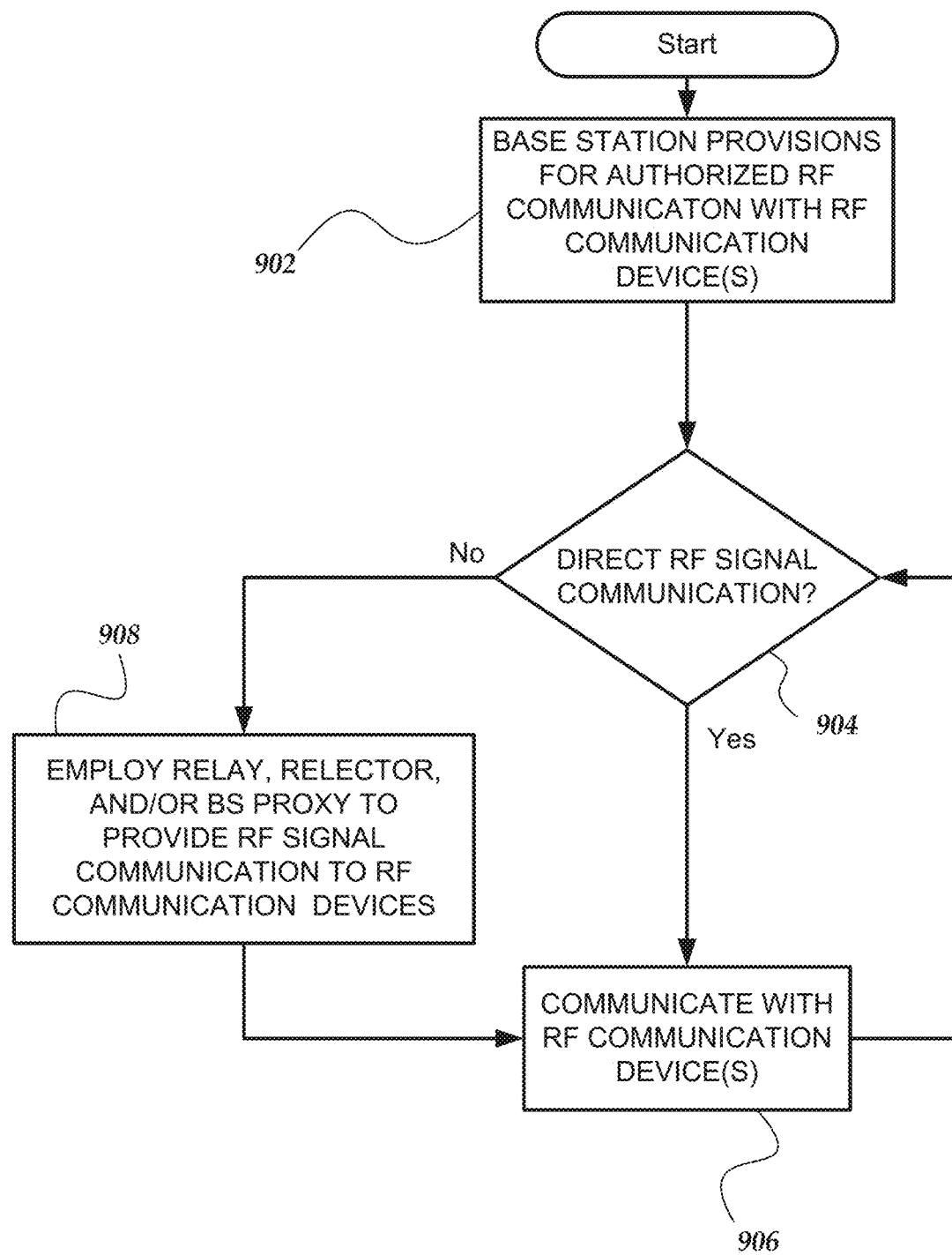
FIG. 9 illustrates an embodiment of a logical flow diagram for an exemplary method of employing different types of HMA devices to communicate by HMA waveforms through a network fabric to one or more wireless computing devices communicating with an HMA user device that provides 5G wireless communication for wireless communication devices.

FIG. 9 illustrates a logical flow diagram of for an exemplary method of employing different types of HMA devices to communicate by HMA waveforms through a network fabric to one or more wireless computing devices communicating with a user HMA device that provides 5G wireless communication for wireless communication devices.

Moving from a start block, the process advances to block 902 where a base station provisions for providing wireless communication with one or more RF communication devices. Next, the process advances to decision block 904, where a determination is made as to whether direct HMA waveform communication is available with one or more wireless communication device users. If yes, the process advances to block 906 where an HMA waveform provides 5g wireless communication with the user's wireless communication device.

Alternatively, if the determination at block 904 is false, the process advances to block 908 where one or more communication HMA devices are configured as a relay, reflector, or base station proxy to provide HMA waveform communication with a user HMA device that enables 5G wireless communication with users' wireless devices. Next, if an occlusion, load balancing, or distance issue is identified that is affecting communication, the process loops back to decision block 904 where the process performs substantially the same actions in a dynamic real time mode of operation.

Figure 10:
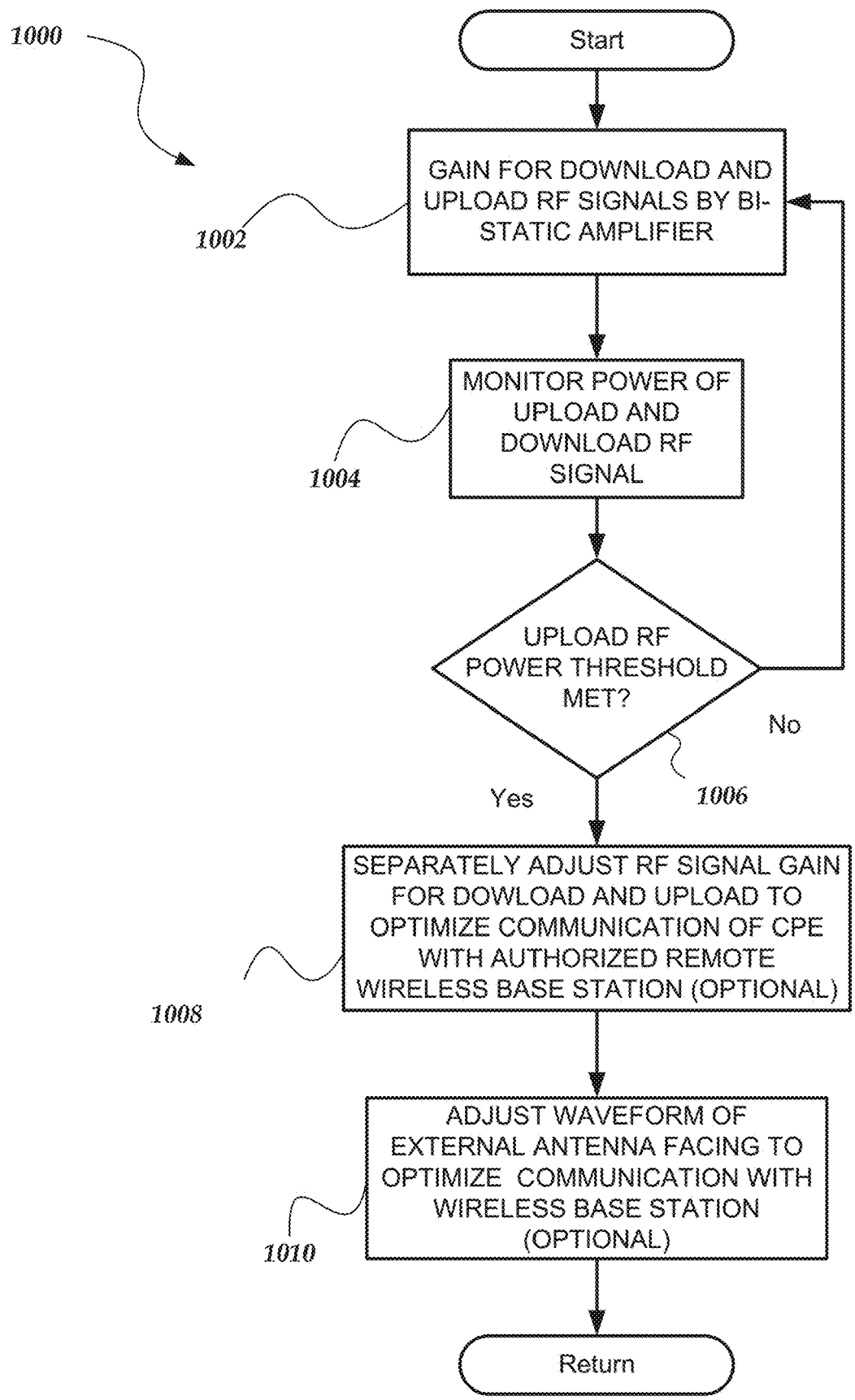
FIG. 10 shows an embodiment of a logic flow diagram for an exemplary method of passively monitoring when the customer premises equipment is in communication with an authorized remote wireless base station in accordance with one or more embodiments.

FIG. 10 illustrates a logical flow diagram of for exemplary method 1000 for employing a value of power of an upload RF wireless signal to determine communication with an authorized remote wireless base station and customer premises equipment. Moving from a start block, the process advances to block 1002 where a separately selectable (continuous) gain is provided to both an upload RF wireless signal and a download RF wireless signal. Next, the process steps to block 1004 where a value of the power of the upload RF wireless signal and another value of the power of the download RF wireless signal is monitored.

Flowing to decision block 1006, a determination is made whether the power value of the upload RF wireless signal meets a threshold value for affirmative communication between an authorized remote wireless base station and a CPE and the other power value of the download RF wireless signal indicates a presence of communication with a remote wireless base station. If false, the process loops back to block 1002 to perform substantially the same actions. However, if the determination at block 1006 is true the process steps to block 1008 where the separately selectable gains for the upload and download RF wireless signals are adjusted to optimize communication between the CPE and the RF communication device and between the remote wireless base station and the RF communication device.

Next, the process advances to block 1010 where optional adjustments to a shape and/or direction of the HMA waveform provided by the external antenna are made to optimize communication of the upload and download RF wireless signals between the RF communication device and the remote wireless base station. Further, the process returns to performing other actions.

Additionally, it will be understood that each block of the flowchart illustrations, and combinations of blocks in the flowchart illustrations, (or actions explained above with regard to one or more systems or combinations of systems) can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In one or more embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

The above specification, examples, and data provide a complete description of the manufacture and use of the invention. Since many embodiments of the invention can be made without departing from the spirit and scope of the invention, the invention resides in the claims hereinafter appended.

What is claimed as new and desired to be protected by Letters Patent of the United States is:

1. A method, comprising:
    employing a plurality of communication holographic metasurface antennas (HMA) devices that are arranged as a network fabric in a physical area and configured to communicate wireless millimeter waveform signals between one or more wireless base stations and one or more holographic beamforming antennas over the physical area to enable communication of the wireless millimeter waveform signals by the network fabric;
    receiving, with a first holographic beamforming antenna, a downlink wireless millimeter waveform signal from a wireless base station that is communicated by the network fabric to the first holographic beamforming antenna;
    amplifying the received downlink wireless millimeter waveform signal; and
    transmitting, with another antenna, the amplified downlink wireless millimeter waveform signal to one or more customer premises equipment (CPE) devices or other wireless devices.

2. The method of claim 1, wherein the other antenna further comprises a second holographic beamforming antenna.

3. The method of claim 1, wherein the other antenna further comprises an open-ended waveguide or one or more patch antennas.

4. The method of claim 1, further comprising:
    receiving the downlink wireless millimeter waveform signal with the first holographic beamforming antenna at an exterior surface of a barrier; and
    transmitting the amplified downlink wireless millimeter waveform signal with the other antenna from an interior surface of the barrier.

5. The method of claim 4, wherein the barrier is a window or a wall.

6. The method of claim 1, further comprising;
    receiving the downlink wireless millimeter waveform signal with the first holographic beamforming antenna at an interior surface of a barrier; and
    transmitting the amplified downlink wireless millimeter waveform signal with the other antenna from the interior surface of the barrier.

7. The method of claim 1, further comprising:
    receiving the downlink wireless millimeter waveform signal with the first holographic beamforming antenna at an exterior surface of a barrier; and
    transmitting the amplified downlink wireless millimeter waveform signal with the other antenna from the exterior surface of the barrier.

8. The method of claim 1, wherein the transmitting the amplified downlink wireless millimeter waveform signal with the other antenna, further comprises:
    arranging a path of the transmission reach around a corner of a structure to provide wireless communication with the one or more customer premises equipment (CPE) devices or other wireless devices.

9. The method of claim 1, wherein the transmitting the amplified downlink wireless millimeter waveform signal with the other antenna, further comprises:
    arranging a path of the transmission reach to avoid an occlusion to wireless communication with the one or more customer premises equipment (CPE) devices or other wireless devices.

10. The method of claim 1, further comprising:
    receiving, with the other antenna, an uplink wireless millimeter waveform signal from the one or more customer premises equipment (CPE) devices or other wireless devices;
    amplifying the received uplink wireless millimeter waveform signal; and
    transmitting, with the first holographic beamforming antenna, the uplink wireless millimeter waveform signal to the wireless base station.

11. The method of claim 10, wherein the amplifying of the received uplink wireless signal and the amplifying of the received downlink wireless millimeter waveform signal further comprises:
    employing a bistatic amplifier to simultaneously amplify the received uplink wireless millimeter waveform signal and the received downlink wireless millimeter waveform signal.

12. The method of claim 11, further comprising:
    separately adjusting gains for the amplifying of the received uplink wireless millimeter waveform signal and the amplifying of the received downlink wireless millimeter waveform signal.

13. The method of claim 10, wherein the amplifying of the received uplink wireless millimeter waveform signal and the amplifying of the received downlink wireless millimeter waveform signal further comprises:
    isolating and timing wireless communication of the uplink wireless millimeter waveform signal and the downlink wireless millimeter waveform signal by switching operation of a bidirectional amplifier.

14. An apparatus, comprising:
    a plurality of communication holographic metasurface antennas (HMA) devices that are arranged as a network fabric in a physical area and configured to communicate wireless millimeter waveform signals between one or more wireless base stations and one or more holographic beamforming antennas over the physical area to enable communication of the wireless millimeter waveform signals by the network fabric;

a first holographic beamforming antenna that is arranged to receive a downlink wireless millimeter waveform signal from a wireless base station that is communicated by the network fabric to the first holographic beamforming antenna; and a downlink amplifier configured for input from the first holographic beamforming antenna and output to another antenna.

15. The apparatus of claim 14, wherein the other antenna, further comprises a second holographic beamforming antenna.

16. The apparatus of claim 14, wherein the other antenna is an open-ended waveguide or one or more patch antennas.

17. The apparatus of claim 14, further comprising:
wherein the first holographic beamforming antenna is configured to transmit an uplink wireless millimeter waveform signal;
wherein the other antenna is configured to receive the uplink wireless millimeter waveform signals; and
an uplink amplifier is configured for input from the other antenna and output to the first holographic beamforming antenna.

18. The apparatus of claim 17, wherein the amplifier further comprises a bistatic amplifier with a downlink gain and an uplink gain that are simultaneous and separately selectable.

19. The apparatus of claim 17, wherein the downlink amplifier further comprises a bidirectional amplifier that provides periodic switching of amplification between a separately selectable uplink gain and a downlink gain.

20. The apparatus of claim 14, wherein the first holographic beamforming antenna further comprises providing a separate vertical polarization and a horizontal polarization for each of an uplink wireless millimeter waveform signal and the downlink wireless millimeter waveform signal.

21. The apparatus of claim 14, wherein employing the plurality of HMA devices further comprises:
providing a mode for each communication HMA device that is dynamically reconfigurable in one of a relay mode, a reflector mode or a proxy base station mode.

22. The apparatus of claim 14, further comprising:
identifying the communication between the wireless base station and the first holographic beamforming antenna as authorized communication.

23. The apparatus of claim 14, further comprising:
in response to a change in the communication of one or more of an uplink wireless millimeter waveform signal and the downlink wireless millimeter waveform signal over the network fabric, dynamically reconfiguring the operation of one or more of the plurality of communication HMA devices to a different mode that ameliorates the change in the communication, wherein the change is based on one or more of an occlusion of the uplink wireless millimeter waveform signal or the downlink wireless millimeter waveform signal, a distance to the one or more holographic beamforming antennas, a distance to the one or more wireless base stations, or a load balance.

24. The method of claim 1, wherein employing the plurality of HMA devices further comprises:
providing a mode for each communication HMA device that is dynamically reconfigurable in one of a relay mode, a reflector mode or a proxy base station mode.

25. The method of claim 1, further comprising:
identifying the communication between the wireless base station and the first holographic beamforming antenna as authorized communication.

26. The method of claim 1, further comprising:
in response to a change in the communication of the uplink and downlink wireless millimeter waveform signal over the network fabric, dynamically reconfiguring the operation of one or more of the plurality of communication HMA devices to a different mode that ameliorates the change in the communication, wherein the change is based on one or more of an occlusion of the uplink wireless millimeter waveform signal or the downlink wireless millimeter waveform signal, a distance to the one or more holographic beamforming antennas, a distance to the one or more wireless base stations, or a load balance.

* * * * *